(12) United States Patent
Sawada et al.

(10) Patent No.: US 7,283,129 B1
(45) Date of Patent: Oct. 16, 2007

(54) DISPLAY CONTROL DEVICE AND REPRODUCTION DISPLAY DEVICE FOR ELECTRONIC BOOKS

(75) Inventors: Yuji Sawada, Osaka (JP); Yasuhisa Nakamura, Nara (JP); Hisashi Saiga, Yamatokoriyama (JP); Masafumi Yamanoue, Yamatokoriyama (JP); Keisuke Iwasaki, Ikoma-gun (JP); Yoshihiro Kitamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 2010 days.

(21) Appl. No.: 09/618,698

(22) Filed: Jul. 18, 2000

Related U.S. Application Data

(62) Division of application No. 09/530,393, filed as application No. PCT/JP98/04324 on Sep. 25, 1998, now Pat. No. 6,441,811.

(30) Foreign Application Priority Data

| Oct. 29, 1997 | (JP) | ..................................... 9-296601 |
| Mar. 31, 1998 | (JP) | ..................................... 10-85405 |

(51) Int. Cl.
*G09G 5/00* (2006.01)
(52) U.S. Cl. ........................ 345/204; 345/173; 715/776
(58) Field of Classification Search ................ 345/156, 345/204, 173, 901, 1.1; 715/776, 864
See application file for complete search history.

(56) References Cited

FOREIGN PATENT DOCUMENTS

| JP | 59-180628 | 10/1984 |
| JP | 63-156477 | 6/1988 |
| JP | 64-86191 | 3/1989 |
| JP | 01-108678 | 4/1989 |
| JP | 1-108678 | 4/1989 |
| JP | 1-158485 | 6/1989 |
| JP | 01-158485 | 6/1989 |
| JP | 1-39129 | 8/1989 |

(Continued)

*Primary Examiner*—Jimmy H. Nguyen
(74) *Attorney, Agent, or Firm*—David G. Conlin; David A. Tucker; Edwards Angell Palmer & Dodge LLP

(57) ABSTRACT

An electronic book display control device capable of solving the problem of a conventional page turning method of an electronic book device that pages are turned in accordance with a value predetermined by a speed controller and hence it is difficult to turn pages flexibly in accordance with the contents of the book and the characteristics of the user. The control device is provided with a CPU (1) which controls the whole device, an image data storage unit (2) in which the contents of the book are stored as image data, an image data control unit (3) which receives the image data and performs the required control, a display preparation image data memory unit (4) in which image data of the page being displayed and the page to be displayed next are stored, and a display unit (5) on which information concerning the image data and information concerning the operation of the electronic book are displayed. The data displayed on the display unit at a specific time in a page turning period are stored in a page turning data memory unit (9) and the column information of the page turning data is stored in a column information storage table (10). In accordance with the column information, the address of the display preparation image data memory unit (4) and the image data on the page being displayed and the page to be displayed next are selected by a display changeover control unit (11).

11 Claims, 31 Drawing Sheets

FOREIGN PATENT DOCUMENTS

| | | |
|---|---|---|
| JP | 1-269174 | 10/1989 |
| JP | 2-3872 | 1/1990 |
| JP | 02-3872 | 1/1990 |
| JP | 02-23469 | 1/1990 |
| JP | 2-23469 | 1/1990 |
| JP | 2-144768 | 6/1990 |
| JP | 2-181864 | 7/1990 |
| JP | 02-230375 | 9/1990 |
| JP | 2-230375 | 9/1990 |
| JP | 03-87977 | 4/1991 |
| JP | 3-87977 | 4/1991 |
| JP | 4-15872 | 1/1992 |
| JP | 04-15876 | 1/1992 |
| JP | 4-21068 | 1/1992 |
| JP | 4-52973 | 2/1992 |
| JP | 04-96092 | 3/1992 |
| JP | 4-96092 | 3/1992 |
| JP | 4-120670 | 4/1992 |
| JP | 4-280376 | 10/1992 |
| JP | 5-53726 | 3/1993 |
| JP | 05-174074 | 7/1993 |
| JP | 06-086222 | 3/1994 |
| JP | 08030254 | 2/1996 |
| JP | 08106469 | 4/1996 |
| JP | 08153114 | 6/1996 |
| JP | 08221444 | 8/1996 |
| JP | 09-081583 | 3/1997 |
| JP | 09097161 | 4/1997 |
| JP | 09-171515 | 6/1997 |
| JP | 09-245054 | 9/1997 |
| JP | 64-086191 | 3/1999 |

FIG.2

| | 0 | 1 | 2 | 3 | 4 | 5 | | M | M+1 | M+2 | M+3 | M+4 | | N |
|---|---|---|---|---|---|---|---|---|---|---|---|---|---|---|
| T0 | A,0 | A,1 | A,2 | A,3 | A,4 | A,5 | | A,M | A,M+1 | A,M+2 | A,M+3 | A,M+4 | | A,N |
| T1 | B,0 | B,1 | A,0 | A,2 | A,3 | A,4 | | A,M | A,M+1 | A,M+2 | A,M+3 | A,M+4 | | A,N |
| T2 | B,0 | B,1 | B,2 | B,3 | A,0 | A,3 | | A,M | A,M+1 | A,M+2 | A,M+3 | A,M+4 | | A,N |
| | | | | | | | | | | | | | | |
| Tp | B,0 | B,1 | B,2 | B,3 | B,4 | B,5 | | B,M | A,M+1 | A,M+2 | A,M+3 | A,M+4 | | A,N |
| Tp+1 | B,0 | B,1 | B,2 | B,3 | B,4 | B,5 | | B,M | B,M+M/2 | B,N | A,M+3 | A,M+4 | | A,N |
| Tp+2 | B,0 | B,1 | B,2 | B,3 | B,4 | B,5 | | B,M | B,M+M/4 | A,M+2M/4 | B,M+3M/4 | B,N | | A,N |
| | | | | | | | | | | | | | | |
| Tq | B,0 | B,1 | B,2 | B,3 | B,4 | B,5 | | B,M | B,M+1 | B,M+2 | B,M+3 | B,M+4 | | B,N |

FIG.5
(a)
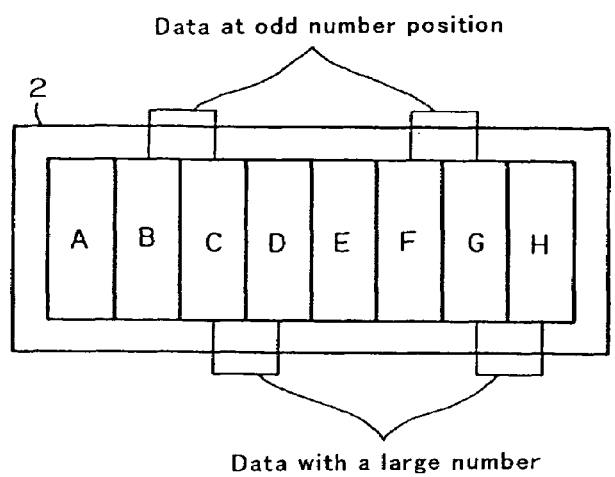
Data at odd number position
Data with a large number
(b)
When turning pages left to right
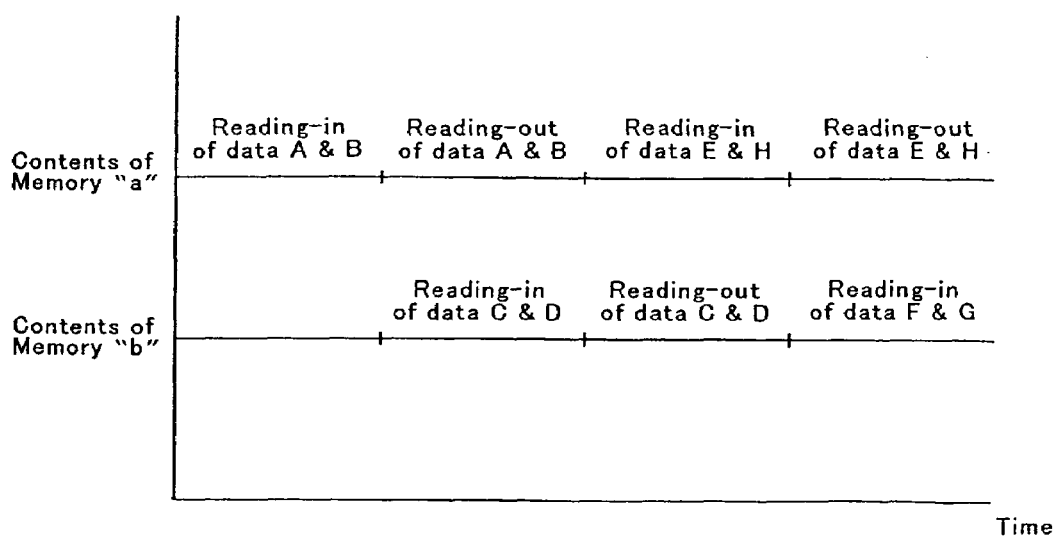

FIG.9

| | 0 | 1 | 2 | 3 | 4 | 5 | | M | M+1 | M+2 | M+3 | M+4 | | N |
|---|---|---|---|---|---|---|---|---|---|---|---|---|---|---|
| T0 | V,0 | V,1 | V,2 | V,3 | V,4 | V,5 | | V,M | V,M+1 | V,M+2 | V,M+3 | V,M+4 | | V,N |
| T1 | A,0 | A,1 | V,0 | V,2 | V,3 | V,4 | | V,M | V,M+1 | V,M+2 | V,M+3 | V,M+4 | | V,N |
| T2 | A,0 | A,1 | A,2 | A,3 | V,2 | V,4 | | V,M | V,M+1 | V,M+2 | V,M+3 | V,M+4 | | V,N |
| | | | | | | | | | | | | | | |
| Tp | A,0 | A,1 | A,2 | A,3 | A,4 | A,5 | | B,M | V,M+1 | V,M+2 | V,M+3 | V,M+4 | | V,N |
| Tp+1 | A,0 | A,1 | A,2 | A,3 | A,4 | A,5 | | A,M | A,M+M/2 | A,N | V,M+3 | V,M+4 | | V,N |
| Tp+2 | A,0 | A,1 | A,2 | A,3 | A,4 | A,5 | | A,M | A,M+M/4 | A,M+2M/4 | A,M+3M/4 | A,N | | V,N |
| | | | | | | | | | | | | | | |
| Tq | A,0 | A,1 | A,2 | A,3 | A,4 | A,5 | | A,M | A,M+1 | A,M+2 | A,M+3 | A,M+4 | | A,N |

| Management Information Area Identifier | 2 |
| --- | --- |
| Data Size | 4 |
| Book Information Area | n |
| Page Information Area | n |
| ................................................ | |

| Page Information Identifier | 2 |
| --- | --- |
| Data Size | 4 |
| Page x Size | 2 |
| Page y Size | 2 |
| Total Number of Pages | 4 |

FIG.18

| Page Data Identifier | 2 |
|---|---|
| Data Size | 4 |
| The number of Objects | 2 |
| Data Area of Object 1<br>    Position Information<br>    High-speed Turning Reproduction Identifier<br>    Object Data | n |
| ............ | |
| Data Area of Object n<br>    Position Information<br>    High-speed Turning Reproduction Identifier<br>    Object Data | n |

FIG.19

| Object Data Identifier | 2 |
|---|---|
| Data Size | 4 |
| Data Classification Identifier | 1 |
| Origin Coordinate (x) | 2 |
| Origin Coordinate (y) | 2 |
| End Coordinate (x) | 2 |
| End Coordinate (y) | 2 |
| High-speed Page-turning Reproduction Identifier | 1 |
| Actual Data Area | n |

FIG.20

| Identifier | Data Classification |
|---|---|
| 0x01 | Character Data |
| 0x40 | Image Data (Usual) |
| 0x41 | Image Data (Divided into The Most Bit-Plane ) |
| 0x42 | Image Data (Divided into Two Halves Bit-Plane) |
| 0x43 | Image Data (Thinned) |
| 0x44 | Image Data (Block Divided) |
| 0x80 | Audio Data |
| 0xA0 | Video Data (Usual) |
| 0xA1 | Video Data (With Representative Frame Area) |
|  |  |
| Others | Reservation |

FIG. 21

| | |
|---|---|
| Image   The Number of Horizontal Pixels | 2 |
| Image   The Number of Vertical Pixels | 2 |
| The number of Planes | 1 |
| 1st Plane Image Compression Method | 1 |
| ............... | |
| nth Plane Image Compression Method | 1 |
| 1st Plane Image Offset Value | 4 |
| ............... | |
| nth Plane Image Offset Value | 4 |
| 1st Plane Image Data | n |
| ............... | |
| nth Plane Image Data | n |

| Image    The Number of Horizontal Pixels | 2 |
|---|---|
| Image    The Number of Vertical Pixels | 2 |
| The number of Bit-Planes | 1 |
| 1st Bit-Plane Compression Method | 1 |
| ............ | |
| nth Bit-Plane Compression Method | 1 |
| 1st Bit-Plane Image Offset Value | 4 |
| ............ | |
| nth Bit-Plane Offset Value | 4 |
| 1st Bit-Plane Data | n |
| ............ | |
| nth Bit-Plane Data | n |

| Image The Number of Horizontal Pixels | 2 |
|---|---|
| Image The Number of Vertical Pixels | 2 |
| Significant Bit Compression Method | 1 |
| Insignificant Bit Compression Method | 1 |
| The Number of Significant Bits | 1 |
| The Number of Insignificant Bits | 1 |
| Significant Bit Image Size | 4 |
| Significant Bit Image Data | n |
| Insignificant Bit Image Size | 4 |
| Insignificant Bit Image Data | n |

| Image   The Number of Horizontal Pixels | 2 |
|---|---|
| Image   The Number of Vertical Pixels | 2 |
| Thinned Image Compression Method | 1 |
| Remaining Pixels Compression Method | 1 |
| Sampling Interval | 1 |
| Thinned Image Data Size | 4 |
| Thinned Image Data | n |
| Remaining Pixels Data Size | n |
| Remaining Pixels Data | n |

FIG.28

| Video Area The Number of Horizontal Pixels | 2 |
|---|---|
| Video Area The Number of Vertical Pixels | 2 |
| Compression Method | 1 |
| Frame 1 Frame Data Size | 4 |
| Frame Data | n |
| ............................ | |
| Frame n Frame Data Size | 4 |
| Frame Data | n |

FIG.29

| Video Area The Number of Horizontal Pixels | 2 |
|---|---|
| Video Area The Number of Vertical Pixels | 2 |
| Representative Frame Data Compression Method | 1 |
| Remaining Video Data Compression Method | 1 |
| Representative Frame Data Area | n |
| Remaining Video Data Area | n |

| The number of Representative Frames | 2 |
|---|---|
| Representative Frame 1 | |
| Frame Number | 4 |
| Frame Data Size | 4 |
| Frame Data | n |
| ..................... | |
| Representative Frame n | |
| Frame Number | 4 |
| Frame Data Size | 4 |
| Frame Data | n |

Original Image → Divided Image

| Image   The Number of Horizontal Pixels | 2 |
|---|---|
| Image   The Number of Vertical Pixels | 2 |
| Compression Method | 1 |
| Block   The Number of Horizontal Pixels | 2 |
| Block   The Number of Vertical Pixels | 2 |
| Block 1 Data Size | 4 |
| Block Image Data | n |
| ............ | |
| Block n Data Size | 4 |
| Block Image Data | n |

FIG.34

Input conditions of the object to be reproduced

☑ Data Classification
　☐ Charac-ter ☐ Image ☐ Audio ☐ Video [Detail]

☐ Data Size
　Only [1000] byte or less

☑ Position Designation
　( [100] , [100] )-( [500] [800] )

☐ Only objects designated by the Author

[Set]
[Cancel]

FIG.35

Setting Details for Data Classification　[Set]

| | |
|---|---|
| Image | ☐ Normal Display<br>☑ Display of only Summary Data<br>Slow ├────────□────┤ Fast |
| Video | ☐ Normal Display<br>☑ Display of only Summary Data<br>Slow ├──────────────□┤ Fast |

Setting Knob

DISPLAY CONTROL DEVICE AND REPRODUCTION DISPLAY DEVICE FOR ELECTRONIC BOOKS

CROSS-REFERENCE TO RELATED APPLICATION

This application is a division of application Ser. No. 09/530,393 filed Apr. 28, 2000 (now U.S. Pat. No. 6,441,811 B1 issued Aug. 27, 2002), which is a 371 of PCT/JP98/04324 filed Sep. 25, 1998.

TECHNICAL FIELD

The present invention relates to an electronic book device by which a user can read an electronic document as if he or she was reading a printed book and, more specifically, relates to an electronic book display control device capable of reproducing electronic image data of a document, and a data structure and a reproduction display device capable of changing the display image contents at a high speed.

BACKGROUND OF THE INVENTION

Prior arts relating to electronic book display control methods for changing display scenes just like turning pages of a printed book are disclosed in Japanese Laid-Open Patent Publication No. 64-86191 and 2-181864. The former provides an electronic book device that has a control portion including a memory for storing two kinds of images, two selectors and a speed controller and can changeover a display image just as it turns a page of the book by presenting a next image on a part of a display area of a preceding image and by gradually increasing the next image and finally displaying a full image on a full screen. The latter provides a user-friendly electronic book device that has a book-contour display portion to display a contour image of the book and open the book when the user points a position on a fore-edge of the book and giving the user a feeling of reading the book by changing the thickness of the fore-edge of the book displayed on the display portion.

Japanese Laid-Open Patent Publication No. 5-53726 describes a display tablet device that detects a trace, a direction and a speed of movement of a pen on a display screen by an input detector.

With a display device for displaying a plurality of data-recorded sheets such as data of plural document pages and image data of a image filing device, one may often change in succession display images to search objective data. In this instance, if display data is fully displayed every time, high-speed changeover of data images cannot be realized and the retrieving efficiency is decreased. In view of the above, an image filing device disclosed in Japanese Laid-Open Patent Publication No. 1-269174 performs the retrieval of objective data in a data image memory in such a manner that a part area of data being displayed on the screen is designated first by the user, the data is then retrieved from the specified data area in the image data memory and displayed by repeating the above cycle of retrieval operations to find the objective data. Japanese Laid-Open Patent Publication No. 4-120670 also discloses such a method that original image data and contracted data of the original image are stored in a memory device, contracted data is read in retrievaling and displayed in succession like turning pages at a high speed.

However, methods disclosed in Japanese Laid-Open Patent Publications No.64-86191 and No. 2-181864 have such drawbacks that the display is controlled according to the data calculated by the speed controller and hence it is difficult to flexibly change the speed of display in accordance with the type and contents of data stored in a memory. For example, it is impossible to change a display image just as turning of a page of the book in spread state. The both systems have the limit to its display control and cannot realize, in this sense, a display that is so called friendly to users.

The above systems can turn pages at a specified display speed calculated by its controller and hence cannot control the display speed in accordance with the contents of data to be displayed or skip a page.

The system disclosed in Japanese Laid-Open Patent Publication No. 5-53726 involves such a problem that it requires, besides display memory, the provision of an additional image-memory whose capacity is two times larger than the display area.

The system disclosed in Japanese Laid-Open Patent Publication No. 1-269174 has no consideration of a method for storing display data necessary for changing page images at a high speed and hence requires time for turning pages.

The system disclosed in Japanese Laid-Open Patent Publication No. 4-120670 has to store a large number of data because the contracted images preliminarily registered include redundant data.

Furthermore, the above systems cannot be adapted to turning pages of a recent available document whose pages may include various kinds of data such as characters, pictures, audio signals and moving pictures on one page.

To solve the above problems involved in the prior arts, the present invention is intended to provide a display changeover control portion including a table for storing column information necessary for turning pages and means for selecting addresses of a display preparation image data storage portion and image data of a current display page and a next display page from the column information, which can control the display speed flexibly in accordance with image data to be displayed, realizing changeover of display images just as turning pages of a printed book.

To solve the problem involved in the prior arts, the present invention also aims at saving of an image data memory capacity to a half the memory capacity of the prior art devices by providing a data latch for reading image data from the display image data storage portion and temporally storing it.

Another object of the present invention is to realize high-speed turning of pages by storing information of a display image sequence in a high-speed read-only memory.

A further object of the present invention is to provide a data structure and a reproduction display device that can perform high-speed changeover of display images.

SUMMARY OF THE INVENTION

An electronic book display control device according to the present invention comprises a central processing unit (CPU) for controlling the whole device, an image data storage portion for storing therein the contents of the book as image data, an image data control portion for receiving the image data and performing required control, a display preparation image data storage portion for storing image data of a page being displayed and image data of a page to be displayed next, a display portion for displaying thereon information concerning the image data and information concerning the operation of the electronic book, a page-turning data storage portion for storing data displayed on the display portion at a specified time for a page-turning period, a column information storage table for storing column information of the page turning data, and a display changeover control portion including a selecting means for selecting an address of the display preparation image data storage portion and image data on the page being displayed and the to be displayed next according the column information. This device can therefore turn pages (display image) just as turning a printed book by flexibly controlling a current image and a next image according to the column information.

An electronic book display control device according to the present invention is also featured by storing the column information table in the image data storage portion and can thereby realize turning of pages in accordance with the contents of the book.

An electronic book display control device according to the present invention is further featured by storing the column information table in a ROM or a rewritable ROM other than the image data storage portion and can thereby realize high-speed and flexible turning of pages.

An electronic book display control device according to the present invention is further featured by pairing the column information table with image data and can easily control image data on the page-by-page basis, thus realizing natural turning of pages of the image data like book.

An electronic book display control device according to the present invention is further featured by reading the column information into a column information storage table based on information observable on an input portion and can thereby display pages of the image data in accordance with the characteristics of the user and the story of the book.

An electronic book display control device according to the present invention comprises a central processing unit (CPU) for controlling the whole device, an image data storage portion for storing therein the contents of the book as image data, an image data control portion for receiving the image data and performing required control, a display preparation image data storage portion for storing image data of a page being displayed and image data of a page to be displayed next, a display portion for displaying thereon information concerning the image data and information concerning the operation of the electronic book, a page-turning data storage portion for storing data displayed on the display portion at a specified time for a page-turning period, a column information storage table for storing column information of the page turning data, a display changeover control portion including a selecting means for selecting an address of the display preparation image data storage portion and image data on a page being displayed and a page to be displayed next according the column information, and a data latch for reading a part of the image data from the display image data storage portion and temporally storing the data therein. This device can therefore realize saving of the capacity of memory for display preparation image.

An electronic book display control device according to the present invention is also featured by storing a difference between data of the page being displayed and data of the page having been displayed just before the current page in the column information storage table, thus realizing further saving of the capacity of memory for display image.

An electronic book display control device according to the present invention is further featured by the providing an input selector and an output selector for selecting a memory at input and output portions of the display preparation image data storage, thereby realizing high-speed display of an image.

An electronic book display control device according to the present invention is further featured by the fact that image data is divided and stored in the image data storage portion so as to be readable in the order necessary for turning pages, thus making it possible to preliminary read data to be displayed and thus achieving display of image data of a story with a saved memory capacity.

A reproduction display device according to the present invention is used for reproducing and displaying element data in units of reproduction of the device, wherein a partial data of the element data includes an identifier for high-speed reproduction and, when a request for a high-speed reproduction signal is given, the partial data is reproduced and displayed successively. This eliminates the necessity of preparing data specially designated for high-speed reproduction in units of reproduction, thereby realizing the reproduction in units of high speed reproduction by using a saved memory capacity. For electronic documents, a unit of data to be displayed is composed of data of each page image, so pages can be fast turned over on the display screen by using a reduced amount of data in a recording medium.

A reproduction display device according to the present invention is also featured by the fact that a partial data of the element (object) data for reproduction is differently compressed from the other data so that it can be reproduced at a further increased speed and achieve more high-speed turning pages than the electronic book. The element data is preferable to be any of the following types:

Namely, the element data is image data, wherein a part of the data is a significant bit image produced by a part of bits of each pixel, a part of the data is a part of each divided bit-plane image, a part of the data is a thinned image produced by thinning pixels and a part of the data is divided image of an original image. The element data may also be video data, wherein a part of the data is a representative frame image selected from the video data.

A reproduction display device according to the present invention is featured by the fact that the element data is image data or video data and a ratio of the partial data to be displayed is changeably set, thereby making it possible for the user to reproduce and display the data at any desired speed even in a high-speed reproduction mode and to easily conduct retrieval of the display data.

A reproduction display device according to the present invention is featured by further provision of condition setting means for presetting at least one of conditions: data type (classification), data size of the element data and position information for a reproduction unit, wherein element data to be reproduced in the high-speed reproduction mode can be selected according to the preset conditions. This makes it possible for the user to omit the unnecessary or undesired data from the scope of reproduction, thus achieving an improved retrieving efficiency and an improved level of the display operation control.

BRIEF DESCRIPTION OF THE DRAWINGS

FIG. 2 is illustrative of data for turning pages by the first embodiment of the present invention.

FIG. 5 illustrates a method for invoking image data to be written into the memory for display preparation.

FIG. 9 is illustrative of data for turning pages by the second embodiment of the present invention.

FIG. 18 is a detailed illustration of stored data of each page of the book data of FIG. 15.

FIG. 19 is a detailed illustration of stored data of object data corresponding to FIG. 18.

FIG. 20 shows the correspondence between data-classification identifiers of object data corresponding to FIG. 18 and actual data.

FIG. 21 illustrates a method for storing usual image data among object data.

FIG. 28 illustrates a method for storing usual video data among object data.

FIG. 29 illustrates a method for storing video data in a representative frame area among object data.

FIG. 34 illustrates an exemplary screen image for setting reproduction conditions of an object in the high-speed page-turning mode.

FIG. 35 is illustrative of an exemplary screen image for setting details of data classification in the high-speed page-turning mode.

DETAILED DESCRIPTION OF THE PREFERRED EMBODIMENT

Figure 1:
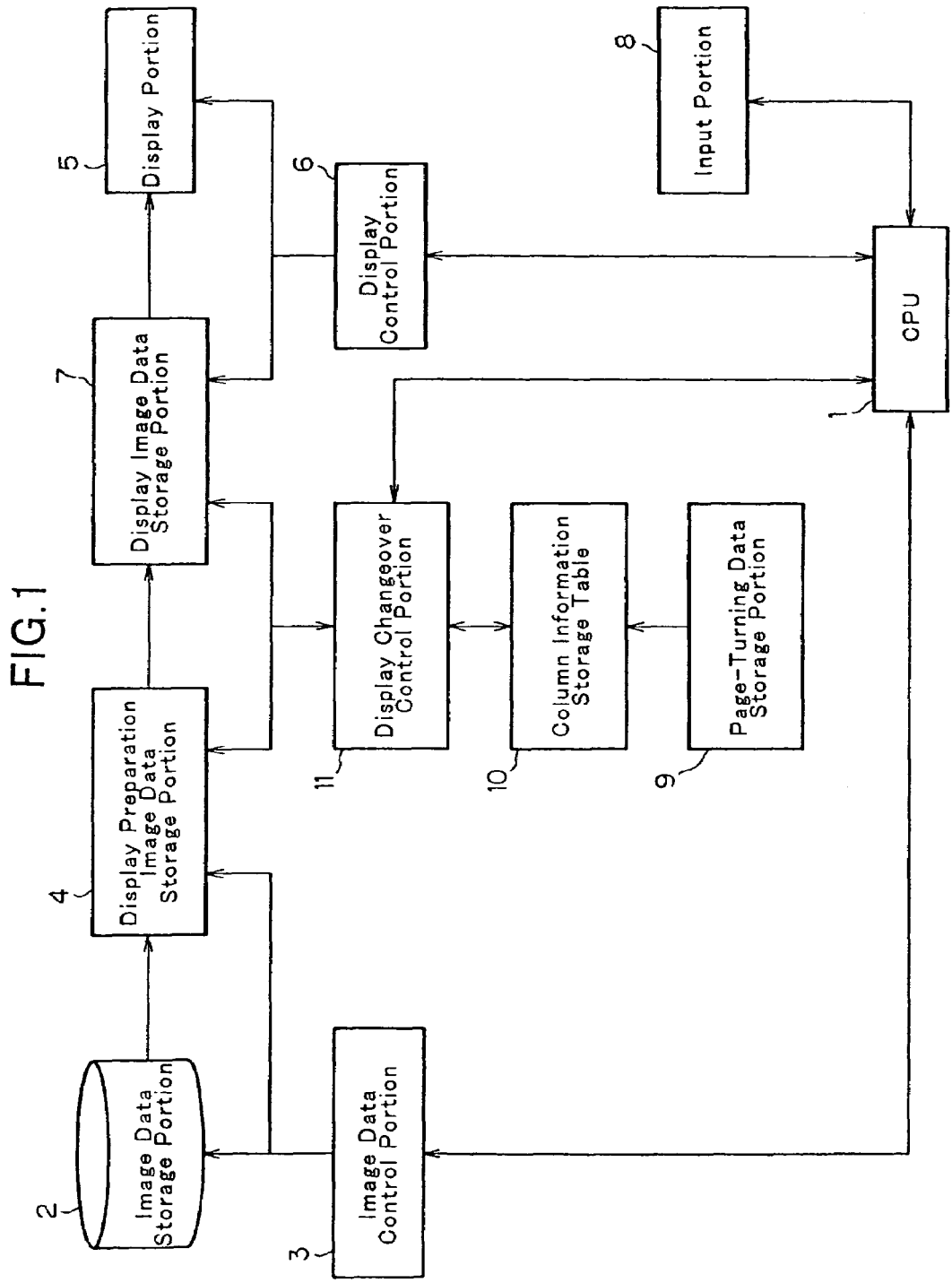
FIG. 1 is a block diagram of a whole device of an electronic book display control device according to a first embodiment of the present invention.

FIG. 1 is a block diagram of an electronic book display control device according to a first embodiment of the present invention.

As shown in FIG. 1, this electronic book display control device is composed of a central processing unit (CPU) 1 for controlling the whole device, an image data storage portion 2 for storing therein the contents of a book as image data, an image data control portion 3 for receiving the image data and performing required control, a display preparation image data storage portion 4 for storing image data of a page being displayed and image data of a next page to be displayed, a display portion 5 for displaying thereon information concerning the image data and information concerning the operation of the electronic book, a display control portion 6 for controlling the display portion, a display image data storage portion 7 for storing data to be displayed on the display portion, an input portion 8 for inputting data by the user to operate the device, a page-turning data storage portion 9 for storing data displayed on the display portion at a specified time for a page-turning period, a column information storage table 10 for storing column information of the page turning data and a display changeover control portion 11 including a selecting means for selecting an address of the display preparation image data storage portion and image data on a page being displayed and a page to be displayed next according the column information. In the present invention, the page to be displayed next may be different from the next page of an actual book, i.e., it may be a next page or a preceding page or a page by several pages before or after the current page of the book if it is displayed next just after the page being displayed.

FIG. 2 shows an example of page-turning data stored in the page-turning data storage portion. First, a vertical row T0-Tq is described. A suffix "q" designates the number of scenes (pages) to be turned over. Each T0-Tq represents a display time of each scene during turning of pages. Information on each display time is described by way example for four pages of a spread book. Let us assume that there is shown a book opened at spread pages 1 and 2 which page 2 is now turned to spread pages 3 and 4.

T0 is a time of beginning of page-turning from the state of the book open at spread pages 1 and 2. T2 is an intermediate time of turning the page 2, whereat a half of the spread is the page 1 and the other remaining half consists of pages 2 and 4 being shown in a certain proportion to each other. Tq is a display time at which the page 2 is further turned to display the page 1 on one half and the page 4 on the other. Turning of page 2 is continued to a display time Tp+2 at which a spread shows page 4 on one half and page 1 plus page 3 in a certain proportion on the other half. Tq is a display time at which the page 2 is completely turned over to present the book opened at spread pages 3 and 4.

In FIG. 2, the horizontal row represents column numbers 0 to N in the display image data storage portion at corresponding points of time while turning pages. In each cell formed at a crossing of the vertical and horizontal rows, there is shown a letter A or B for representing a page being displayed or to be displayed next and a column number in the display preparation image data storage portion, which corresponds to a column number in the display image data storage portion. For example, the third cell from the left of the vertical time row T2 contains a code (B, 3) indicating that the data in the third row from the left in the display image data storage portion is read from the third row from the left of the display preparation image data memory in which a page to be displayed next is stored.

Figure 3:
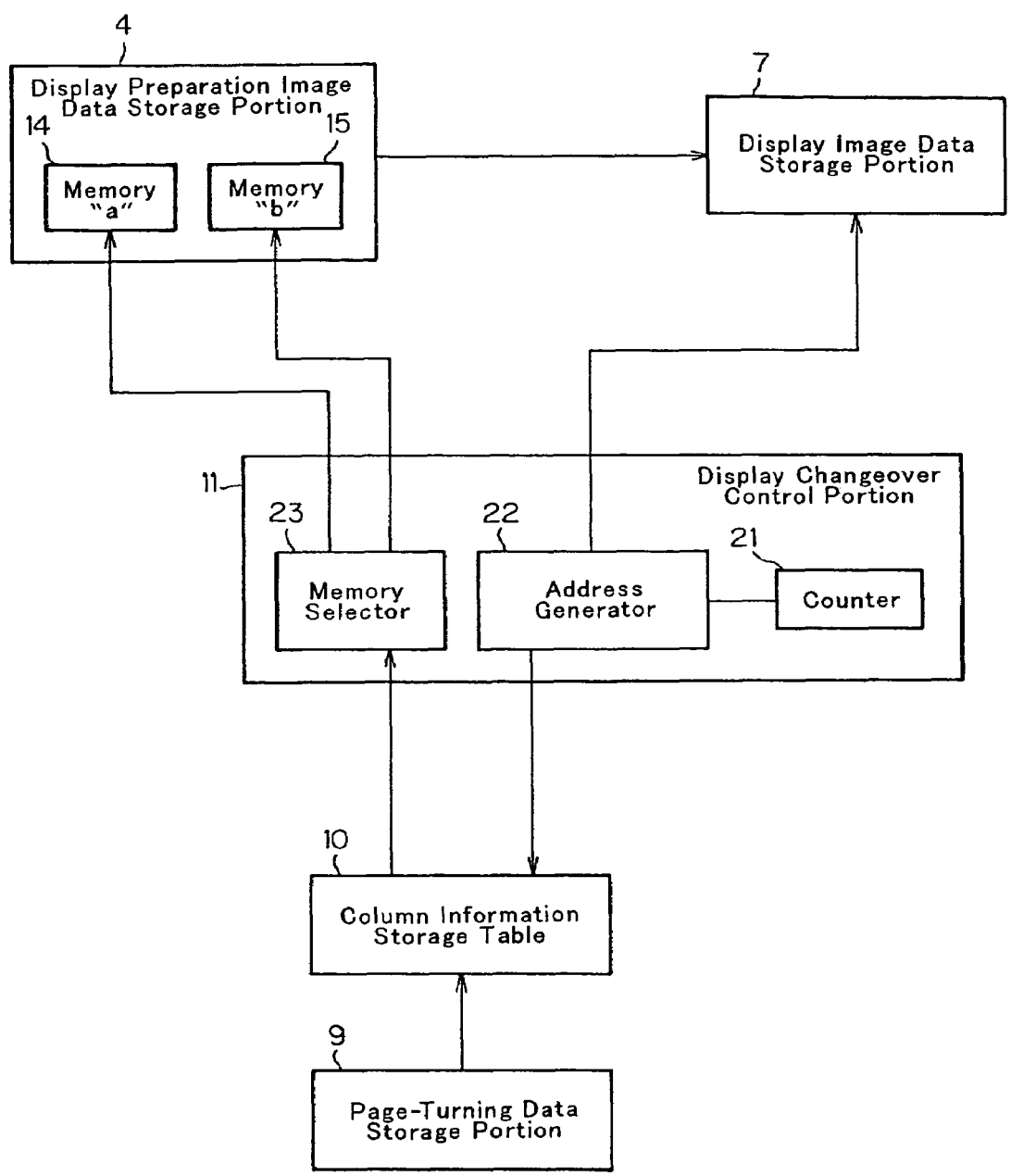
FIG. 3 is a detailed view of a display changeover control portion of the first embodiment of the present invention.

FIG. 3 is a detailed block diagram of the display changeover control portion of FIG. 1, wherein numerals 14 and 15 designate two different memories in the display preparation image data storage portion, which memories are classified as memory "a" and memory "b" respectively. In FIG. 3, the components corresponding to those of FIG. 1 are given the same numerals. Numeral 21 denotes a counter for controlling scenes of turning pages. The counter 21 counts scenes from 0 and the number of count at the time of Tq is q. Numeral 22 designates an address generator for repeatedly generating addresses of the display image data storage portion. Namely, it subsequently generates addresses from the left top to the right bottom in the display image data storage portion. Numeral 23 denotes a memory selecting portion for selecting any one of the memories of the display preparation image data storage portion referring to column information storage portion. Namely, it selects either the memory "a" or the memory "b".

Figure 4:
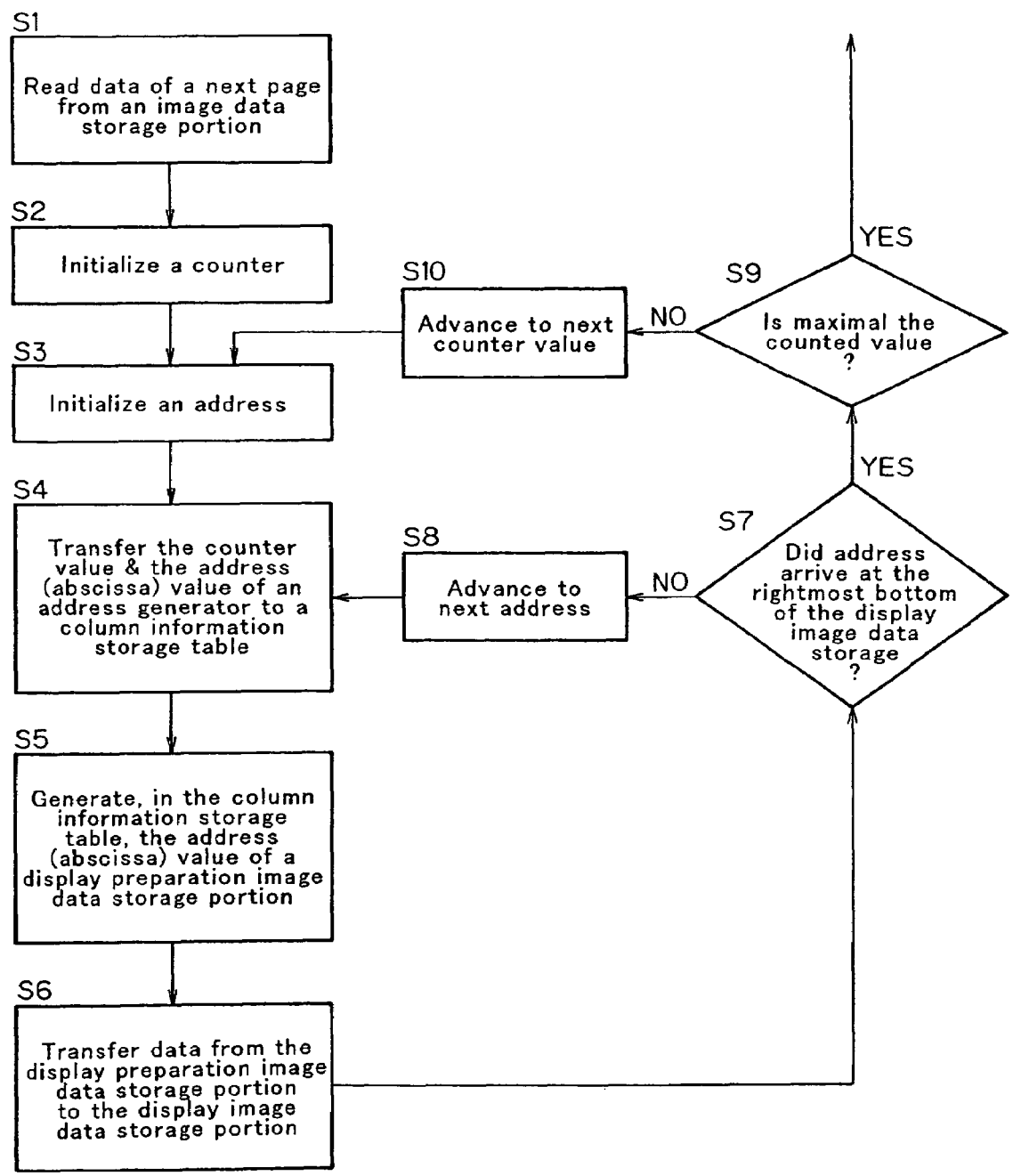
FIG. 4 is a flow chart illustrating the procedure according to the first embodiment of the present invention.

The operation of the display changeover control portion will be described below in detail with reference to the flowchart of FIG. 4.

When a request for displaying a next page was input from the input portion, the CPU receives the request and transfers it to the image data control portion. According to the request, the image data control portion reads image data of a next page from the image data storage portion and writes the read-out image data of the next page into either memory "a" or "b", which is not occupied with image data of the page being displayed (Step S1). Namely, the image data of the page to be displayed next is stored in the memory "b" if the image data of the page being displayed is stored in the memory "a".

A time point of reading the image data corresponds to a time T0 of beginning turning of a page. Therefore, the display changeover control portion sets "0" at the counter (Step S2). At this time point T0, the address generator sets the leftmost top address (0, 0) as an address of the display image data and initializes the address (Step S3).

The display changeover control portion sends the count value 0 and the abscissa value (x coordinate) 0 to the column information storage table (Step S4). The display changeover control portion acquires a corresponding memory of the display preparation image data storage portion and the abscissa value (x coordinate) from the column information storage table (Step S5). In this instance, the memory of the display preparation image data memory is A and the abscissa value (x coordinate) is 0 since the column is 0 and the time is T0.

The memory selector receives the above data and selects the memory of the display preparation image data storage portion and the display changeover control portion transfers the display preparation image data designated by the display preparation image data storage portion as the above to the display image data storage (Step S6). In Step S7, a routine judges whether the display image data has been completely displayed. When all the addresses of the display image data storage portion have been scanned according to the addresses produced by the address generator, the process advances to Step S9. Otherwise, the process advances to Step S8. The scanning is completed when all addresses from the leftmost top to the rightmost bottom on an image have been scanned during the display of display image data for turning a page on the screen. As is on usual display devices, the scanning is carried out in the direction from the leftmost top point on a scene to the rightmost lower end thereon.

If a scan of the addresses of the display image data storage has not been accomplished, the address generator advances the address to a subsequent not-yet-scanned address (Step S8).

In case when the current scanned address is the last address, i.e., the value "c" of the counter satisfies the condition c≧q, the display changeover control portion finishes the page-turning operation and waits for a next request for turning pages (Step S9).

If c<q, then a constant K is added to the counter (Step S10). K determines the number of display image-data columns to be skipped. For example, K=1 denotes all columns are displayed, while K=2 denotes columns are displayed on the basis of one column for each two columns. The value of K may be preliminarily fixed by the display changeover control portion or may be changed according to information input and observed on the input portion of FIG. 1. The information observable on the input portion is, for example, a speed or strength of a stroke or a gesture input through the input portion. This makes it possible to control a page-turning speed and/or degree depending upon the observable information.

In Step S10, a time necessary for turning a page with K=1 is represent by Tf and, therefore, a time necessary for turning a page with K=3 can be determined as Tf/3.

It is also possible to turn pages in the reverse direction by preliminary setting the value K to, e.g., −1, setting the value "q" as an initial value of the counter in Step S2 and the condition q≦0 for Step S9 and selecting a reverse memory by the memory selector.

Figure 11:
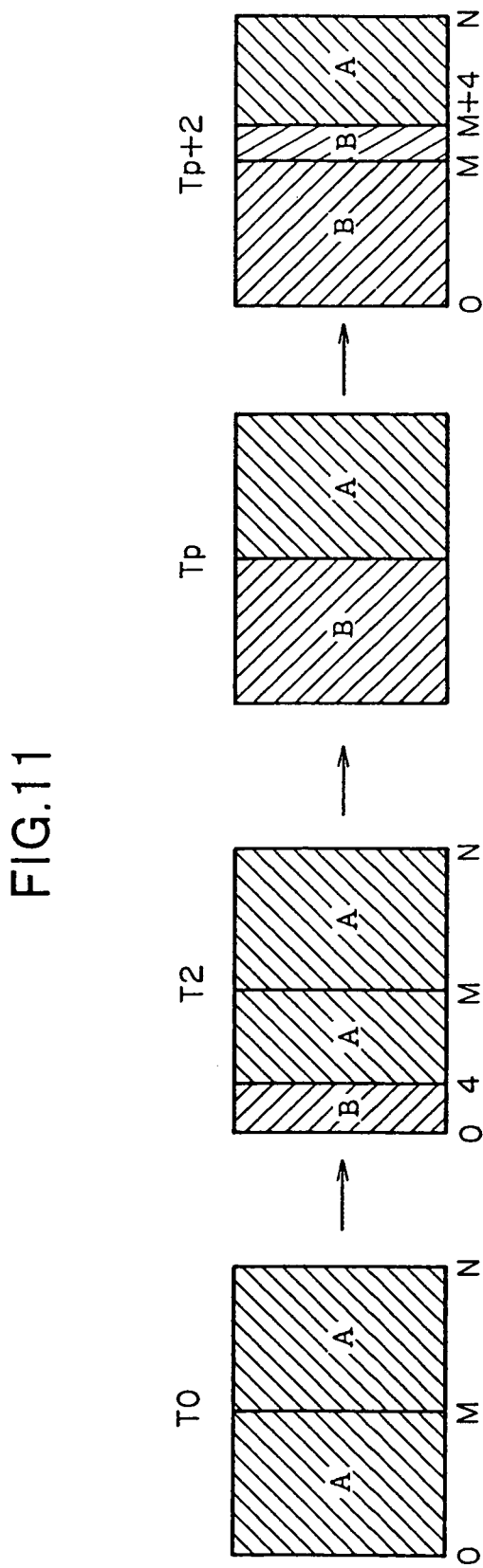
FIG. 11 shows a transition state during turning pages.

The data stored in the page turning data storage portion is as follows:

FIG. 11 illustrates transition states of turning pages in the display image data storage portion at time points T0, T2, Tp, Tp+2 and Tq. In FIG. 11, it is assumed that A is a display preparation image memory for image data of a page being displayed and B is a display preparation image memory for image data of a page to be displayed next.

In the exemplary page-turning data of FIG. 2, it is seen that data columns 0, 1, 2, 3 from the memory B is selected as data to be transferred at a time point T2 to display image data columns 0, 1, 2, 3 of the display image data storage portion, while data columns 0, 3, M, N from the memory A is selected as data to be transferred at the same time point T2 to display data columns 4, 5, M and N.

At the time point Tp+2 (FIG. 2), data columns M+M/4, M+M/2. M+3M/4 and N from the memory B is transferred to display image data columns M+1, M+2, M+3 and M+4, respectively, of the display image data storage portion.

As described above, the arrangement of the page-turning data in the page-turning data storage portion as shown in FIG. 2 makes it possible to cause an image to change with time as if one turned pages of an actual paper book.

The natural flexible turning of pages can be realized by changing values of the page-turning data table since the page-turning data table is obtained without using any arithmetic operational circuit.

Although the page-turning data storage portion has been described as differing in construction from the image data storage portion, the former may be made common with the latter portion so that the page-turning data can be stored together with the image data in a common image data storage portion. In this case, the image data control portion stores page-turning data together with image data of the image data storage portion in the display preparation image data storage portion. The display changeover control portion receives the above page-turning data from the display preparation image data storage portion instead of the turning-data storage portion. The other processing steps are similar to those described in the above example.

The page-turning data storage portion may use a ROM or a rewritable ROM such as a flash ROM or EEPROM, which may be used in the same way as the above described. In case of using the rewritable ROM with page-turning data of FIG. 2, if a feeling of page-turning on the device is different from that of page-turning of an actual paper book, it is possible to realize more natural turning of pages with visually impressive movement of pages or in accord with the user's eye characteristics by rewriting page-turning data.

It is also possible to use in pairs the column information storage table and image data. In this instance, Step S1 (FIG. 4) is changed as follows:

In Step S1, the image data control portion calls page-turning data together with the data of a page to be displayed next and the display changeover control portion transfers the page-turning data to the column information storage table.

Figure 12:
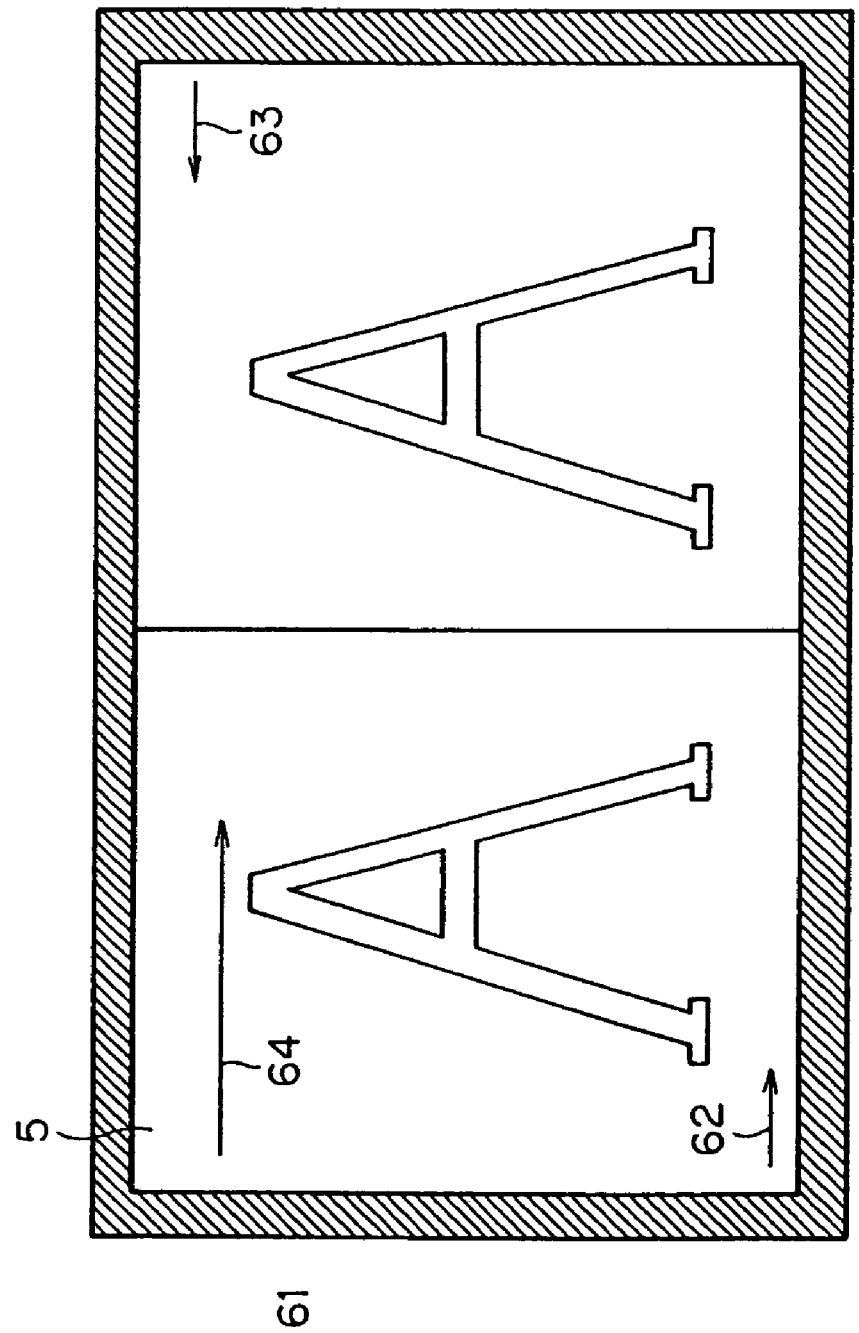
FIG. 12 schematically illustrates information representing a request for turning pages in input portion.

FIG. 12 depicts how to process a request for turning pages, which is input through an input portion of an electronic book display device according to the present invention. A contour of the device is shown at 61. A white portion is a display portion. In this embodiment, a pen tablet that is an input device with a display unitarily formed therewith. The pen tablet can sense a speed of the pen moving thereon. In FIG. 12, a direction and a speed of movement of the pen is indicated by an arrow and its line length respectively. For example, arrow 62 represents the pen moving slowly to the right. Arrow 63 represents that the pen slowly moves to the left, while arrow 64 represents that the pen fast moves to the right. For example, the rightward movement of the pen is indicated by a positive sign (+), the leftward movement of the pen is indicated by a negative sign (−) and a maximal and minimal speeds of the pen movement, which can be detected by the input portion, are represented by vmax and vmin respectively. Turning a page in accord with the movement of the pen can be realized by setting K-value to an integer, i.e., K=q at vmax and K=1 at vmin. In the other words, the use of the tablet being an integral input-display portion makes it possible to control page-turning based upon information input through the input portion.

In the integral input-display type pen tablet device, a pointing device may be a pen and/or a finger.

The tablet device can recognize a gesture of the pen by using a coordinate digitizing function of the pointing device. For example, it is possible to realize turning to a next page by writing a Japanese Hiragana character "の" with a usual stroke of the pen, turning to a preceding page by writing the character "の", with a reverse stroke of the pen, designating the number of pages to be skipped by a size of the character "の" and specifying a speed of turning a page in proportion to a speed of writing the character "の".

Figure 6:
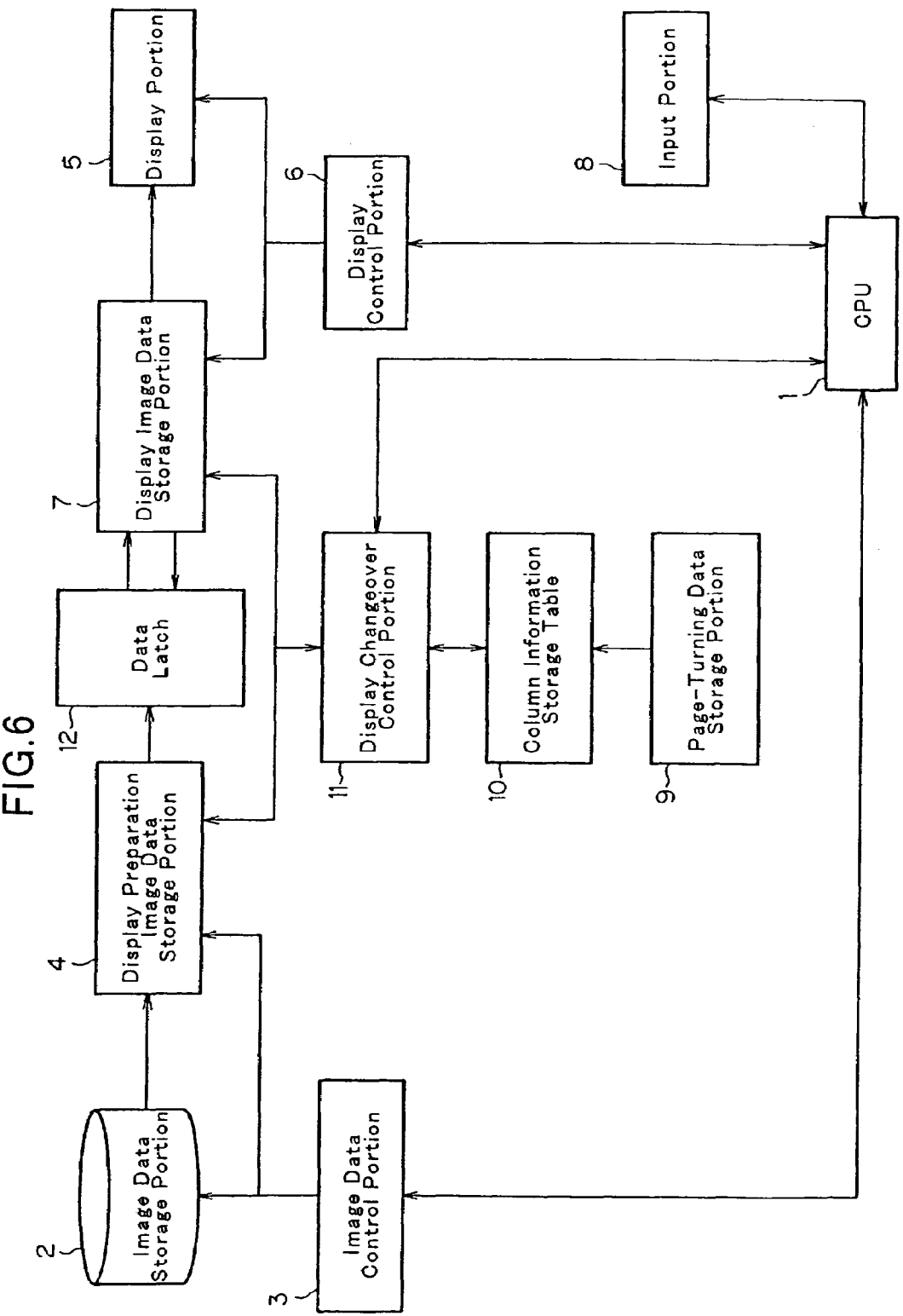
FIG. 6 is a block diagram of a whole system of an electronic book display control device according to a second embodiment of the present invention.

FIG. 6 is a block diagram of an electronic book display control device according to a second embodiment of the present invention. This display control device comprises a central processing unit (CPU) 1 for controlling the whole device, an image data storage portion 2 for storing therein the contents of the book as image data, an image data control portion 3 for receiving the image data and performing required control, a display preparation image data storage portion 4 for storing image data of a page being displayed and image data of a page to be displayed next, a display portion 5 for displaying thereon information concerning the image data and information concerning the operation of the electronic book, a display control portion 6 for controlling the display portion 5, a display image data storage portion 7 for storing data to be displayed on the display portion, an input portion 8 for inputting user's commands for operating the electronic book, a page-turning data storage portion 9 for storing data displayed on the display portion at a specified time for a page-turning period, a column information storage table 10 for storing column information of the page turning data, a display changeover control portion 11 including a selecting means for selecting an address of the display preparation image data storage portion and image data on a page being displayed and image data on a page to be displayed next according to the column information, and a data latch 12 for storing a part of image data.

Figure 7:
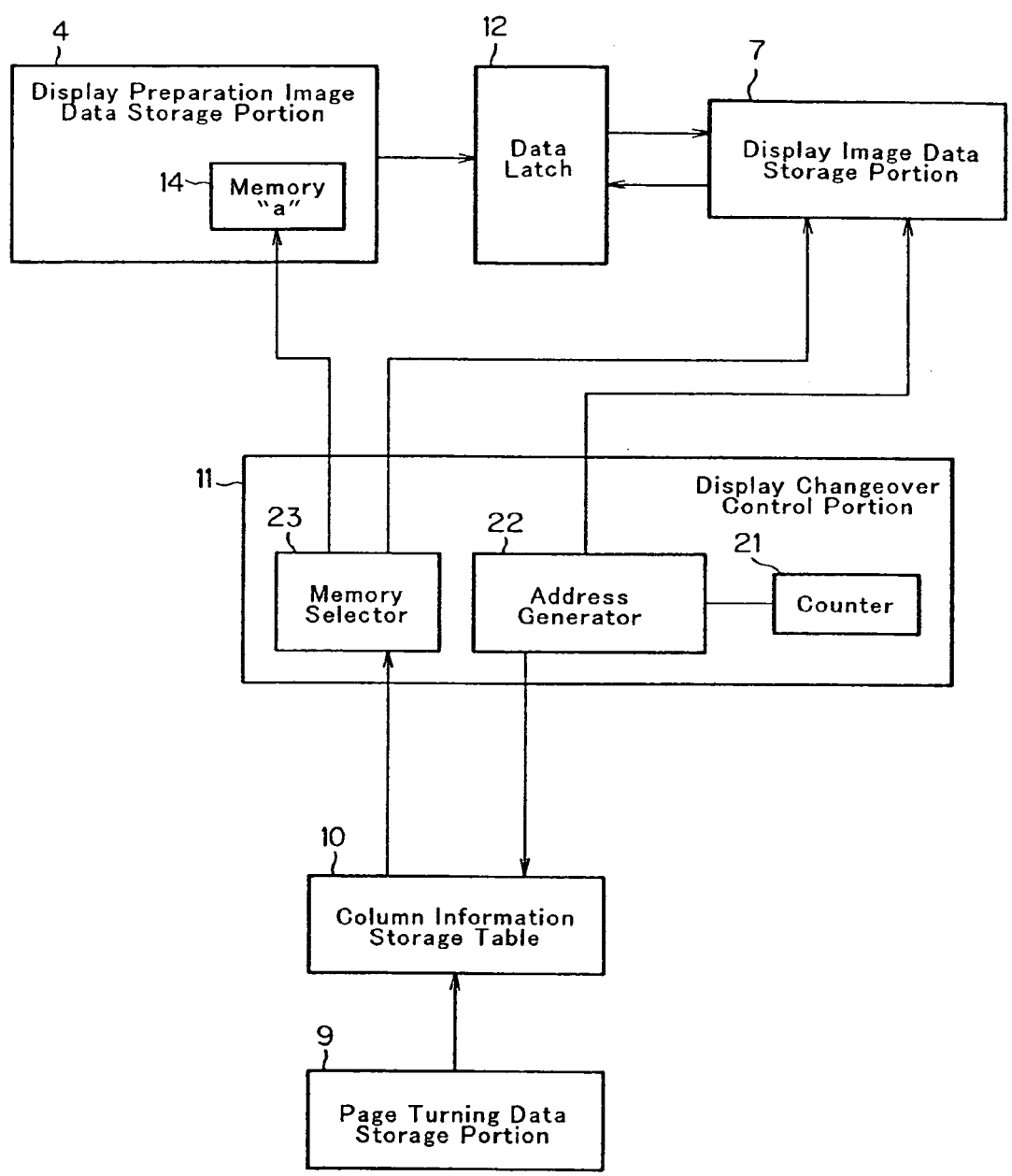
FIG. 7 is a detailed view of a display changeover control portion of the second embodiment of the present invention.

FIG. 7 shows a detailed structure of the display changeover control portion of FIG. 6 and relevant portions disposed there around. A memory selector selects either of a memory "a" and a display image data storage portion. The data latch is disposed between the memory "a" and the display image data storage portion and exchanges data with the display image data storage portion.

The data latch is a memory that can temporally store 1 pixel data. It receives data of one pixel from the display image data storage portion, receives data of one pixel from the display preparation image data storage portion and transfers the received data to the display image data storage portion. The shown structure of this embodiment is distinct from the structure of the embodiment of FIG. 3 only by the presence of the data latch, by which the capacity of the display preparation image data storage portion is saved by half in comparison with the embodiment of FIG. 3.

Figure 8:
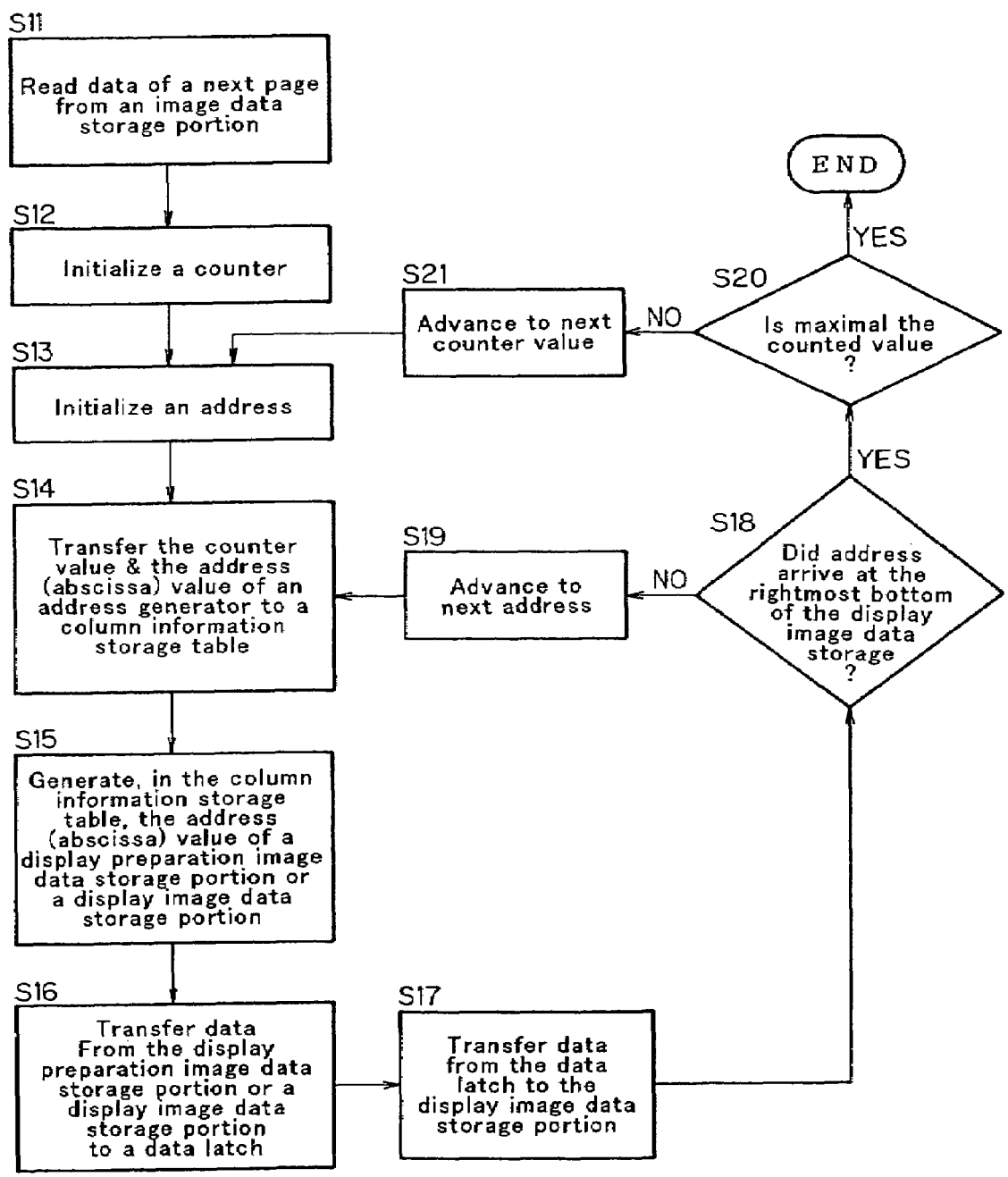
FIG. 8 is a flow chart illustrating the procedure according to the second embodiment of the present invention.

FIG. 8 is a flowchart depicting the operation of the electronic book display control device of FIG. 6. Referring to FIG. 8, the operation of the data latch of the display control device according to the second embodiment of the present invention will be described below.

Upon receipt of a request for displaying a next page from the input device, the CPU transfers the request to the image data control portion that in turn reads image data of a next page from the image data storage portion and writes the read-out image data of the next page into either memory "a"

or "b" of the display preparation image data storage portion, which is not occupied with image data of the page being displayed (Step S11). Namely, the image data of the page to be displayed next is stored in the memory "b" if the image data of the page being displayed is stored in the memory "a".

Since a time point of reading image data corresponds to a time point T0 of beginning turning of a page, the display changeover control portion sets "0" at the counter (Step S12). At the time point T0, the address generator sets the leftmost top address (0, 0) as an address of the display image data and initializes the address (Step S13).

The display changeover control portion sends the count value 0 and the abscissa value (x coordinate) 0 to the column information storage table (Step S14). The display changeover control portion acquires a corresponding memory of the display preparation image data storage portion and the abscissa value (x coordinate) from the column information storage table (Step S15). Namely, the display preparation image data storage portion is selected and the abscissa value (x coordinate) is determined to be zero since the column is 0 and the time is T0.

The memory selector receives the above data and selects the memory of the display preparation image data storage portion and the display changeover control portion transfers the display preparation image data designated by the data latch as the above (Step S16). The display changeover control portion transfers display image data from the data latch to the display image data storage portion (Step S17).

On completion of scanning all the addresses of the display image data storage, the process advances to Step S20. Otherwise, the process advances to Step S19 (Step S18).

If a scan of the addresses of the display image data storage has not been accomplished, the address generator advances the address to a subsequent not-yet-scanned address (Step S19).

In case when the last address was scanned and the value "c" of the counter satisfies the condition $c \geqq q$, the process is finished (Step S20). If $c<q$, then 1 is added to the counter (Step S21).

FIG. 9 shows an example of storing a difference between the current page data and the preceding page data in a table for storing column information of page-turning data that uses V and B instead of B and A (FIG. 2) respectively. V designates display image data storage portion and A designates the display preparation image data storage portion. The cell 4 at a time point T2 contains a value V, 2. This means that the data existing in column 0 at time T0 moves to column 2 at time T1 and further to column 4 at time T2. In other words, the page-turning data shown in FIG. 9 is composed of a difference from the preceding page data. This can realize turning of pages like those of an actual book with no additional arithmetic circuit, i.e., with a saved memory capacity.

Figure 10:
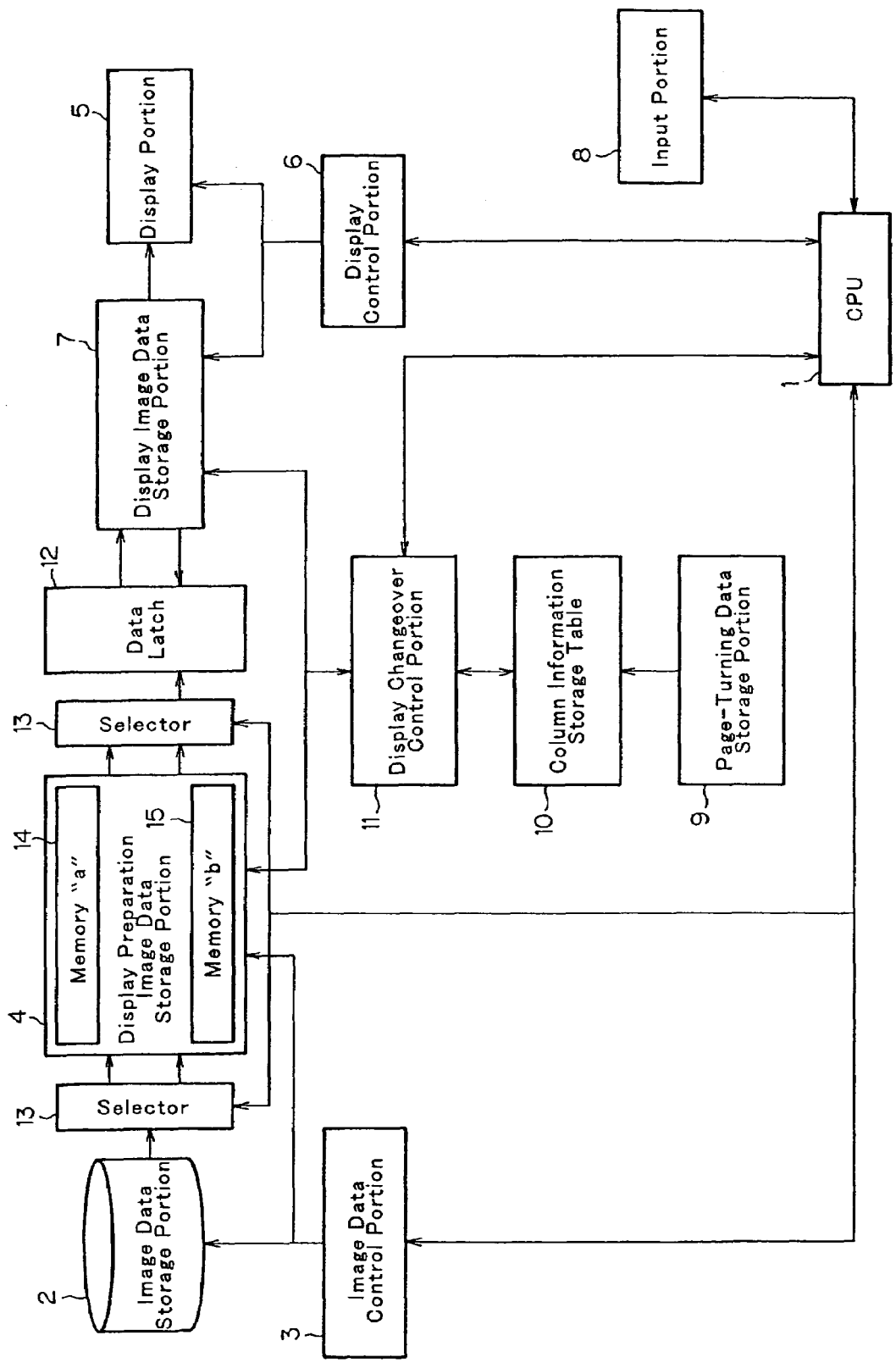
FIG. 10 is a block diagram of a whole system of an electronic book display control device according to a third embodiment of the present invention.

FIG. 10 is a block diagram of an electronic book display device that is a third embodiment of the present invention. This display control device comprises a central processing unit (CPU) 1 for controlling the whole device, an image data storage portion 2 for storing therein the contents of the book as image data, an image data control portion 3 for receiving the image data and performing required control, a display preparation image data storage portion 4 for storing image data of a page being displayed and image data of a page to be displayed next, a display portion 5 for displaying thereon information concerning the image data and information concerning the operation of the electronic book, a display control portion 6 for controlling the display portion 5, a display image data storage portion 7 for storing data to be displayed on the display portion, an input portion 8 for inputting user's commands for operating the electronic book, a page-turning data storage portion 9 for storing data displayed on the display portion at a specified time for a page-turning period, a column information storage table 10 for storing column information of the page-turning data, a display changeover control portion 11 including a selecting means for selecting an address of the display preparation image data storage portion and image data on a page being displayed and image data on a page to be displayed next according the column information, a data latch 12 for storing a part of image data, and a selector 13 for selecting a desired memory to be referred when reading/writing the display preparation image data.

The selector 13 controls two memories "a" and "b" of the display preparation image data storage portion in such a way so as to transfer data between the memory "b" and the data latch while the memory "a" is connected to the image data storage portion and so as to transfer data between the memory "b" and the image data storage portion while the "a" is connected to the data latch.

The image data stored in the image data storage portion is divided so that it can be read in the order necessary for turning pages. Let us assume that image data is divided into eight blocks A-H and stored in the image data storage portion as shown in FIG. 5(a). In each block, image data are arranged in ascending order of their column numbers. The blocks A, D, E and H contain even-column-numbered data and the blocks B, C, F and G contain odd-column-numbered data. In case of turning pages from left to right, data blocks A and B are read first until a next page is open to 45° (the page-turning state Tq/4). After the state Tq/4, the image is displayed with thinned data columns. If the odd-numbered data blocks are read first, the data can be read in the order shown in FIG. 5 by subsequently reading the data blocks A, B, C, D, E, H, F, G.

The display preparation image data storage portion is divided into two in each of which eight blocks of divided-images are read by twos under the control of the selector 1. In this instance, as shown in FIG. 5(b), blocks A and B are read in the memory "a" and blocks C and D are then read in the memory "b". The memory "a" can be accessed from the data latch while reading blocks C and D is read in the memory "b". The memory "b" can also be accessed from the data latch while blocks E and H is read in the memory "a". Thus, reading image data from the image data storage portion and accessing from the data latch can be performed parallel in time. The above structure of the memory system is achieved by using memories "a" and "b" each having the capacity corresponding to a half of the image size.

According to the present invention, it is possible to turn pages of the electron book by controlling the column information and display image data, thus realizing turning pages of the book just like opening a printed book by flexibly controlling images of the current page and the next page. The natural flexible turning of pages can be realized by changing values of the page-turning data table without using any arithmetic operational circuit.

It is also possible to turn pages in accordance with the contents of the image by storing column information storage table in the image data storage portion that stored the image data. Fast and flexible turning of pages can be also realized by storing the column information storage table in a ROM or rewritable ROM other than the image data storage portion. The control of image data on the page-by-page basis can be easily performed by pairing the column information table with the image data. This makes it possible to naturally turn pages just like turning pages of a printed book.

It is also possible to turn pages in accordance with the user's characteristics and the stories of the data to be displayed by reading the column information to the column information storage portion according to the information input and observed on the input-display portion.

It is further possible to save to half the capacity of the display preparation image data memory by the provision of the data latch for reading and storing the image data from the display preparation image data portion.

It is possible to further reduce the capacity of the display image data memory by storing, in the column information storage table, information on a difference between the current page data and the preceding page data.

It is also possible to reduce a time necessary for turning pages by using an input selector and an output selector provided for selecting memories at an input-output portion of the display preparation image data storage portion.

It is further possible to naturally turn pages of the electronic book with a reduced capacity of the memory by dividing the image data stored in the image data storage portion into blocks thinning it to be readable in the order necessary for turning pages and by thinning the data.

An example of using an electronic book display control device as a reproduction display device will be described below. This electronic book display device reproduct the digital data of electronic book data (hereinafter, refereed to as "book data") of magazines and novels and comics as the data for reproduction. It is also applied for a general reproductive display device such as an image filing device for reproducing different digital data.

Figure 13:
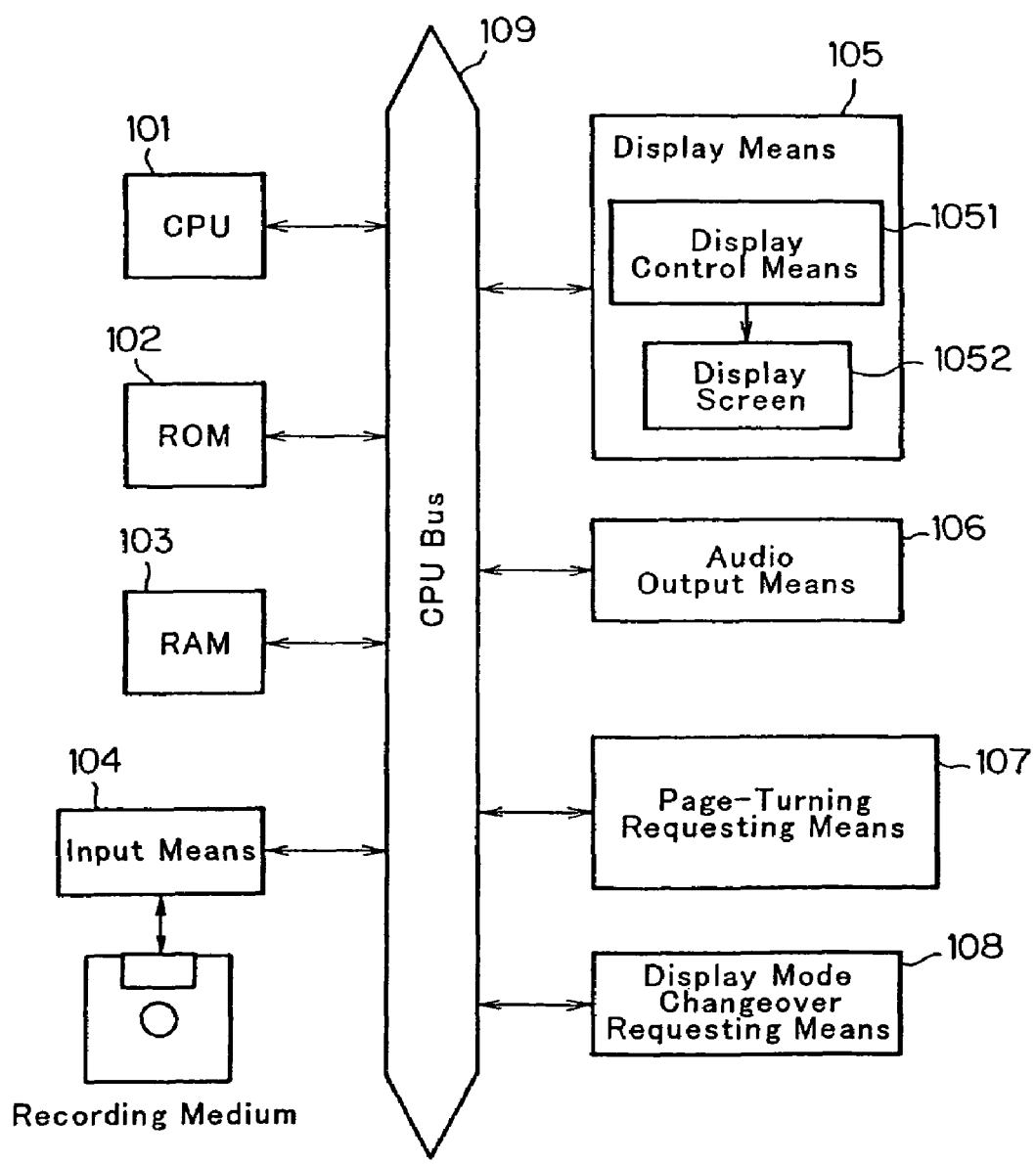
FIG. 13 is a block diagram of electronic book display device according to the present invention.

FIG. 13 is a block diagram of electronic book display device according to the present invention. In FIG. 13, a reproduction display device comprises a central processing unit (CPU) 101 being a control means, a ROM 102 for storing a system control program, a RAM 103 for storing program a working area for executing the program and storing book data such as page data, a input means 104 such as a communication line and a disk drive for reading book data stored on a recording medium and reproducing the read data, a display means 105 for display book data, audio output means 106 for outputting audio book data recorded on a recording medium, a page-turning requesting means 107 allowing the user to specify a mode of turning pages of the electronic book at a high speed or at a usual speed (by using, e.g., buttons), a display mode changeover requesting means 108 allowing the user to select any one of page-data display modes, and a CPU bus 109 for interconnecting the above components of the device. According to the control program stored in the ROM 102, the CPU 101 controls the input means 104, display means 105 and audio output means 106 to reproduce and display the book data and performs various kinds of processing by the user's request input through the page-turning requesting means 107 or the display mode changeover requesting means 108. The display means 105 is composed of a display control means 1051 for controlling the contents to be displayed on a display screen and a display screen 1052.

Figure 14:
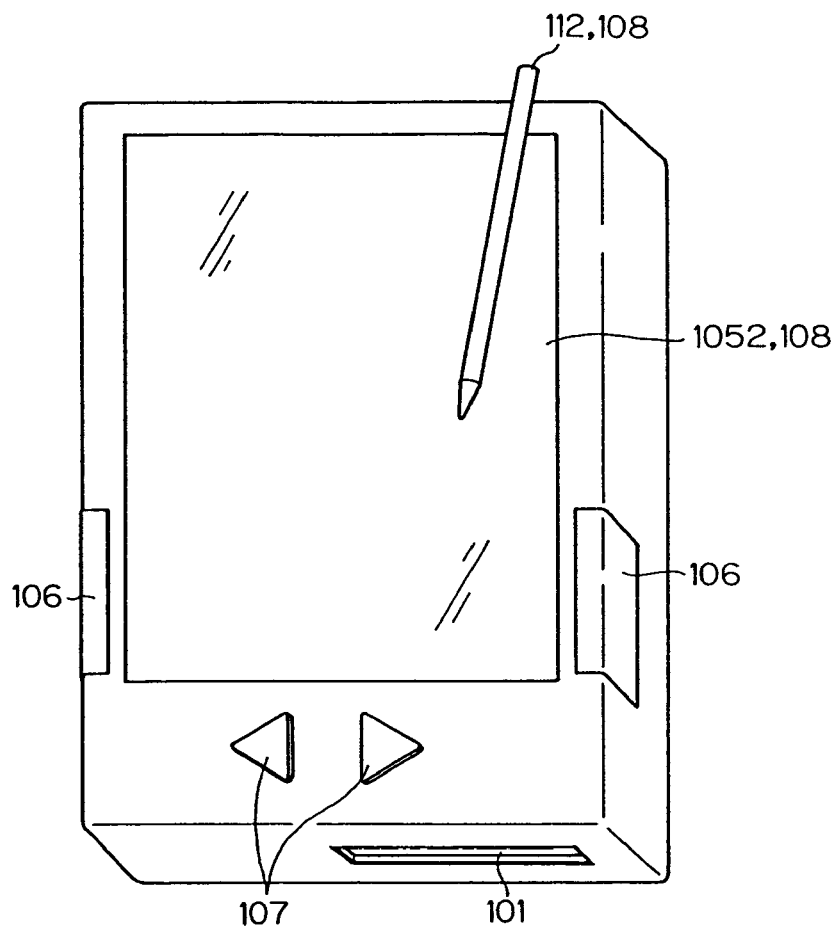
FIG. 14 is an external view of a portable type electronic book display device of FIG. 13.

FIG. 14 shows an external appearance of the electronic book display device according to the present invention. In FIG. 14, the device includes all components shown in FIG. 13, wherein the display screen 1052 has a bonded thereon touch-sensitive resistive-film tablet that is used as the display mode changeover requesting means 108 and the user's request inputting means. Buttons provided on the tablet is also used as the page-turning requesting means 107 by which the user can request the device to turn pages at a normal speed or a high speed. Numeral 111 designates an inlet for inserting a recording medium carrying a record of a book data and numeral 112 designates a pen for inputting the request for changing the display mode or other kinds of requests and commands.

Figure 15:
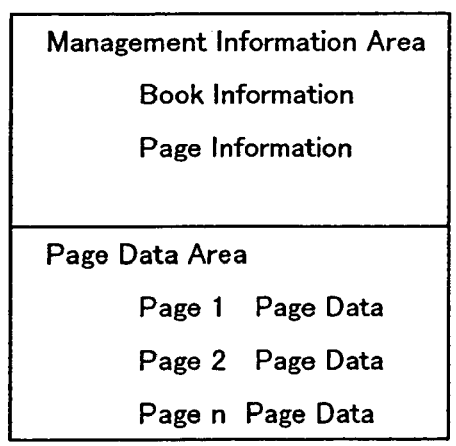
FIG. 15 is a schematic illustration of a format of book data to be reproduced by an electronic book display device according to the present invention.

FIG. 15 schematically illustrates a format for storing data of a book to be displayed on this electronic book display device. As shown in FIG. 15, the book data is composed of management data area including book information (e.g., title) and page information (e.g., the size of each page) and a page data area wherein page data corresponding to the text of book data is divided and stored on page-by-page basis. The data is recorded on a recording medium such as an IC card and a disc.

Figures 16, 17:
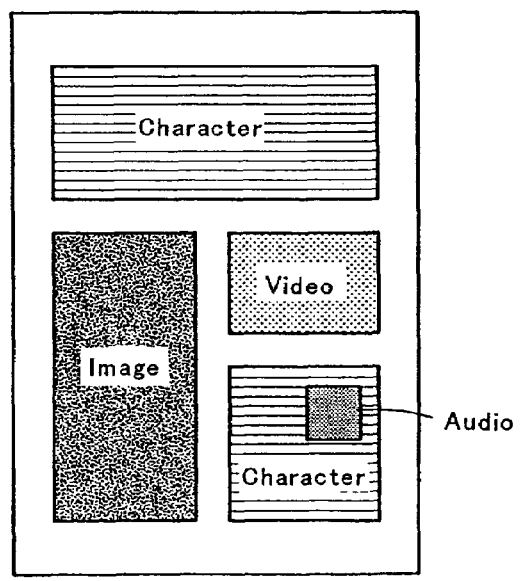
FIG. 16 is a detailed illustration of stored data in a book-data control-information area of FIG. 15.
FIG. 17 is a mimic illustration of each page composed of plural objects arranged therein.

FIG. 16 illustrates an exemplary structure of a management information area of book data. In the management information area, there is stored an identifier for indicating a management information area, a data size showing the size of this area, a book information area for storing a title of the book, the author's name and a page information area for storing a page size and the number of pages. Each page has a coordinate system imaginarily provided thereon with an origin disposed at the top left vertex of the page. A page area of each page size has a record of coordinate values of its bottom right vertex in this coordinate system. In FIG. 16, a numeric value in each right column shows the number of bytes to be stored.

As shown in FIG. 17, each page is composed of element data (hereinafter referred to as objects) such as character data, image data, audio data and video data.

Namely, respective objects are arranged on an imaginary page having a page size defined in the page information area as shown in FIG. 16. Audio data not to be displayed is imaginarily disposed on a whole page or in a relevant area.

FIG. 18 illustrates a method for storing data of each page in a page data area (in FIG. 15). Each page data includes a page data identifier showing the subsequent information concerning page data, a data size showing the number of bytes of the page data, the number of objects composing page data, and object data areas each storing data of each object. In FIG. 18, each numeral in each right column shows the number of bytes to be recoded.

FIG. 19 depicts a method for storing object data in each object data area. As shown in FIG. 19, the object data area is composed of an object data area identifier declaring this area is the object data area, a data size of this area, a data classification identifier, coordinate values of an origin and an end point for recording a top left position and a bottom right position of a rectangular area in which the object is located, a reproduction identifier determining whether the object is reproduced when fast turning of pages is requested, and an actual data area for storing actual object data.

In FIG. 19, the high-speed page-turning reproduction identifier is used for setting, at the stage of preparing book data, an important object or an object being significant only for particular contents to be reproduced at a high speed. It is also used for setting the identifier at a specified interval of pages to present an image of the book as if its pages were ruffled. In FIG. 19, each numeral in each right column shows the number of bytes to be stored.

The data classification identifier in FIG. 19 is used for specifying a kind of the object and a method of storing the object. In FIG. 20, there is shown a table showing the correspondence of data classification identifiers to data classification in FIG. 19. Namely, the classification of an actual data area and a method for storing actual data can be recognized by reading the value of a data classification identifier.

A practical method for storing actual data in an actual data area will be described below:

Large-size data such as image data, audio data and video data requires a lot of time to read from the recording medium, which makes it difficult to create scenes of high-speed turning of pages. Therefore, such data is divided as necessary into summary data and remaining data, which are then separately stored. The summary data is used to display images of high-speed turning of pages. In case when the summary data and the remaining data are compressed and stored, it is necessary to provide an information area for designating a method of compressing the summary data in different from a method of compressing the remaining data (as necessary) for the following reason:

The data to be used for fast turning of pages is preferably less compressed so that the data may be read from the recording medium, thawed (expanded) and displayed for possibly short period. On the contrary, the book data composed of the images, audio and video each containing a large amount of data is usually required to be compressed to a smallest data size. In particular, the book data having no need of being displayed at a high speed is highly compressed even with an elongated time of expansion. Consequently, it is preferable to compress and store the summary data required for fast reproduction in different from the remaining data not required for fast reproduction. For example, the summary data is compressed by the run length encoding method that can encode the data for a short time while the remaining data is compressed by the arithmetic-arithmetic encoding method that requires time but can highly compress the data.

FIG. 21 depicts a method for storing usual image data defined by a data classification identifier of 0x40. The data of this format is stored in an actual data area shown in FIG. 19. In FIG. 21, a numeral in each right column shows the number of bytes to be stored. The same is applied to the structure of actual data to be described below.

As the number of bytes is known, desired data can be read by specifying the desired number of bytes. As shown in FIG. 21, the numbers of pixels in rows and columns of an image, the number of image planes, information designated according to compression method for each plane image, offset information on the number of bytes representing position of an actual image from an initial position of an actual data area and data of each actual plane image are stored in the described order. The each plane image is compressed by the designated compression method. For a mono-chromatic image, the number of planes is set to 1 and image data is stored only in the first plane image area. For a color image, data are represented by YUV color system adopted by JPEG, the number of planes is set to 3, a Y-plane image, a U-plane image and a V-plane image are compressed by corresponding designated compression methods and stored in the first, second and third plane areas respectively. In the YUV color system, the Y-plane image is of luminance components of the original image, which can be used as summary data of the original image. Therefore, only Y-plane images are read and displayed for expressing turning pages of a book at a high speed.

It is also possible to use, instead of the YUV color system, the YCrCb color system in which image data is represented by luminance signal and color difference signal and, in this instance, the luminance signal is used as the first-plane image, and the RGB color system in which the G-plane image may be stored in the first plane image.

Figures 22, 23:
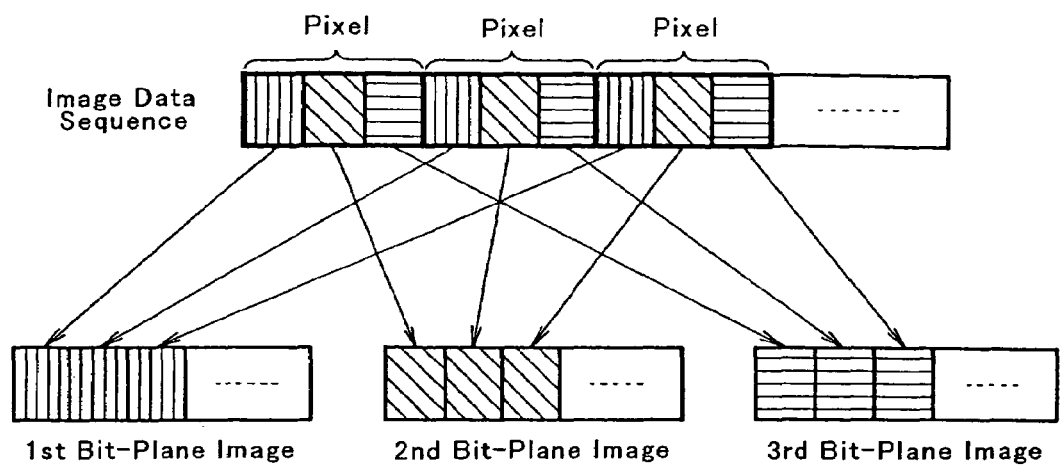
FIG. 22 depicts a method for decomposing image data into individual bit-plane images.
FIG. 23 depicts a method for storing image data after decomposing into individual bit-plane images among object data.

For image data of the type defined by the data classification identifier 0x41, each image is decomposed into bit-plane images: A bit-plane image composed of a most significant bit (upper bit) of each pixel is first stored and a subsequent bit-plane image composed of a second bit of each pixel is stored next and so on. FIG. 22 is mimic illustration of a method for decomposing an image data composed of pixels having each 3 bits into bit-plane images. At the top is image data before decomposition, whose pixel values are recorded each by 3 bits. The image is decomposed to form a first bit-plane image by the first bit of each pixel, a second bit-plane image by the second bit of each pixel and a third bit-plane image by the third bit of each pixel.

The concept of FIG. 22 (for the image whose pixels are composed of 3 bits respectively) can be easily expanded to an image whose pixels are composed of n bits. For a color image, a R-plane image, a G-plane image and a B-plane image are processed respectively as shown in FIG. 22: an i-th bit-plane image is formed by i-th bit of a pixel of the R-plane, i-th bit of a pixel of the G-plane image, i-th bit of a pixel of the B-plane image and stored in the described order of pixels. This is based on the fact that an understandable summary image can be reproduced by using only bit-plane images each formed of only most significant bit or the several most significant bits. Therefore, it is useful to decompose images into bit-plane images and read-out merely bit-planes composed of the most significant several bits for display scenes of turning pages at a high speed. This makes it possible to achieve high-speed reproduction of the images with a saved time for reading data from the recording medium.

FIG. 23 illustrates a data format when storing image data in the form of bit-planes. The data is stored in the actual data area shown in FIG. 19. As shown in FIG. 23, the number of pixels in rows and columns of an image, the number of bit planes, information on a designated compression method for each plane image, offset information on the number of bytes representing position of an actual image from an initial position of an actual data area and data of each bit plane image are stored in the described order. The each bit plane image is compressed by the method designated in terms of the compression method.

Figures 24, 25:
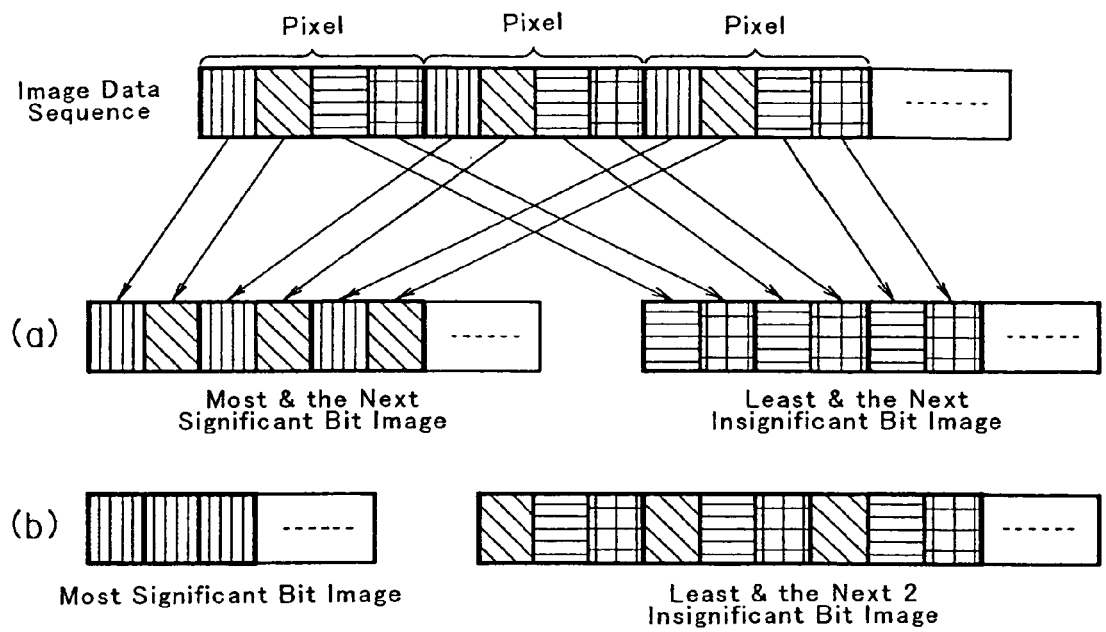
FIG. 24 depicts a method for decomposing each of the image data pixels into significant bit images and insignificant bit images.
FIG. 25 depicts a method for storing image data after decomposing into significant bit images and insignificant bit images of each of the image pixels among object data.

For image data of the type defined by the data classification identifier 0x42, each image is decomposed into two bit planes i.e., a bit-plane image composed of only a most significant bit or several more significant bits of each pixel and a bit-plane image composed of remaining bits of each pixel. Two bit-plane images thus obtained are separately stored. FIG. 24 is mimic illustration of a method for decomposing an image of pixels having each 4 bits into two bit-plane images. At the top is image data before decomposition, in which pixels are composed of 4 bits. The image is decomposed to form a significant bit-plane image by top and second bits of each pixel and an insignificant (lower) bit-plane image by the third and fourth bits of each pixel. Two resultant images are shown in FIG. 24(a). The image can also be decomposed into two images, one of which is composed of only a most significant bit of each pixel and the other is composed of remaining bits of each pixel.

The concept of FIG. 24 (for the image whose pixels are composed of 4 bits) can be easily expanded to an image whose pixels are composed of n bits, so it is not restricted to 4 bits. For a color image, a R-plane image, a G-plane image and a B-plane are processed respectively as shown in FIG. 24: a significant bit-plane image formed from plane images R, G and B are stored as a significant bit-plane image and an insignificant bit-plane image formed from bit-plane images R, G and B is stored as an insignificant bit-plane image.

FIG. 25 illustrates a data format when storing image data in this form of bit-planes. The data is stored in the actual data area shown in FIG. 19. As shown in FIG. 25, the numbers of vertical and horizontal pixels of an image (the number of pixels in rows and columns of an image), compression methods for the significant bit plane image and the insignificant bit plane mage, the number of bits from each pixel for forming the significant bit plane image and the insignificant bit plane image, the significant bit plane image size and data, and the insignificant bit plane image size and data are stored in the described order. The significant bit plane image and the insignificant bit plane image are compressed by the methods designated in terms of the compression methods respectively. Storing image data by this form makes it easy to read only summary image data formed of significant several bits. To display image data of the type defined by the data classification identifier 0x41, it is necessary to read several bit-plane images formed of several most significant bits and synthesize them. On the contrary, the shown data storing method stores most significant bit plane images formed of several most significant bits of each pixel, thus omitting the synthesizing process and thereby achieving faster turning of pages.

For image data of the type defined by the data classification identifier 0x41, the page turning speed can be adjusted in several steps by adjusting the number of bit-plane images to be read. In contrast, the described data storing method can adjust the page turning speed in two steps by reading only the most significant bit plane image or both bit plane images. For image data of the type defined by the data classification identifier 0x43, a thinned image formed by sampling pixels one for every several pixels in vertical and horizontal directions from an original image and an image formed of remaining pixels are stored separately from each other.

Figures 26, 27:
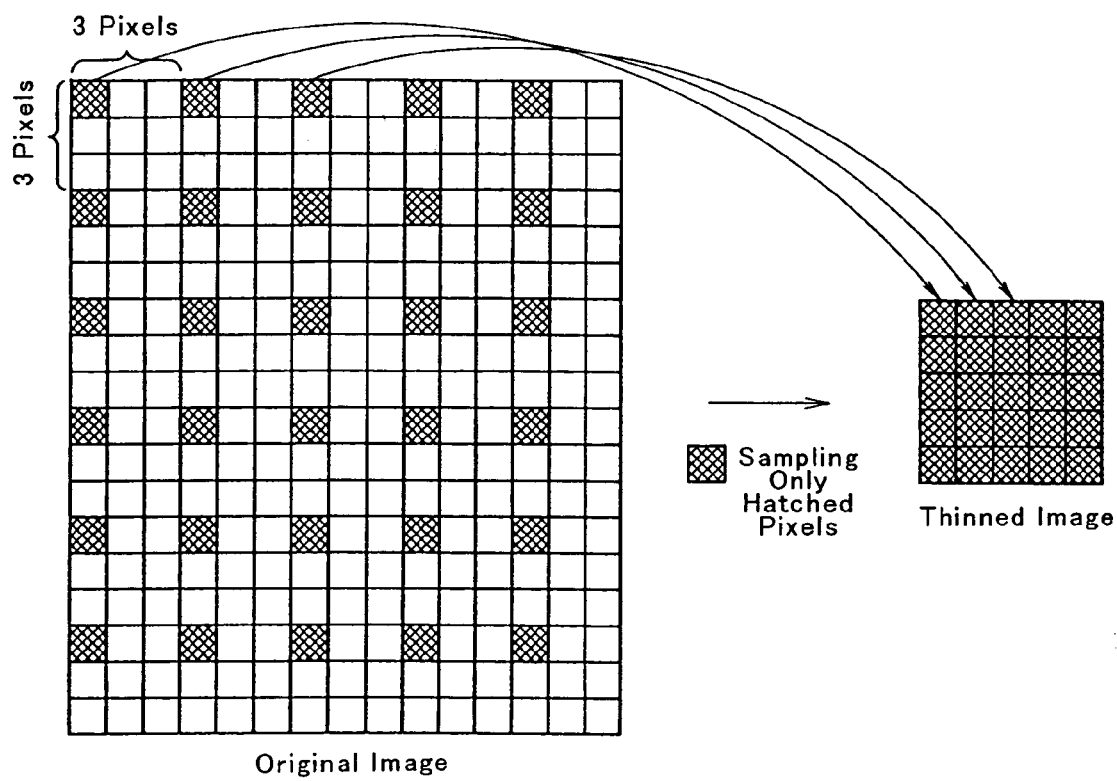
FIG. 26 illustrates how to produce a thinned image by sampling pixels at intervals of the specified number of pixels
FIG. 27 illustrates a method for storing image data after decomposing into thinned image and remaining pixel data among object data.

FIG. 26 illustrates how to produce a thinned image by sampling one for every three pixels from the original image. In FIG. 26, each square in a grating represents one pixel. From the original image shown left in FIG. 26, pixels are subsequently taken one for every three pixels (marked by mesh) in vertical and horizontal directions and arranged in the same order as in the original image This produce a thinned image as summary data of the original image. This thinned image is read to use when turning pages at a high speed, thus saving time necessary for reading image data from the recording medium. FIG. 27 shows an exemplary format for storing a thinned image. The data in this format is stored in an actual data area shown in FIG. 19. The numbers of vertical and horizontal pixels of an image, compression methods for the thinned image and the remaining pixel data, the sampling interval, the data size of the thinned image, the remaining pixel data size and the remaining pixel data are stored in the described order. The thinned image data and the remaining pixel data are compressed by the designated methods respectively.

A format for storing video data to be used for presenting high-speed turning of pages will be described below. FIG. 28 shows a format for storing usual video data (with a data classification identifier 0xA0) and FIG. 29 shows an exemplary format for storing video data for presenting high-speed turning of pages (with data classification identifier 0xA1). As shown in FIG. 28, usual video data is recorded in the form of the number of vertical and horizontal pixels of the video area, designation of a method for compressing frame data and the format of video data. Each frame data is compressed by the designated method and stored together with its frame data size in order of time. The video storing format of FIG. 29 provides an additional area of a representative frame data. Several representatives of time-sequential frame data composing video data are selected, compressed by the designated method and stored together with frame number (counted from the top frame) and frame data size in the above additional area. Other frames are also compressed respectively by the designated method and stored in order of time in a remaining video data area shown in FIG. 29. The method for storing each frame data in the remaining video data area is the same as that of the frame data shown in FIG. 28. Sets of frame data size and frame data per frame are stored in order of time in the above remaining video data area. In the high-speed page-turning mode, only representative frame data area is read, thus reducing time required for reading data from the recording medium and reproducing the data.

When retrieving a desired page by turning pages, one may often search it by using position information on each page. For this purpose, all objects have position information on each page. When the user designates an area, objects included at least partly in the designated area are retrieved and reproduced. However, a large object projecting out of the designated area may be read with its unnecessary portion, i.e., with the loss of time. Especially, a large object occupying a large area of the display screen may bring a large loss of time. In view of the above, each large object is divided in advance into several areas and stored. This makes it possible to easily retrieve and display a data area of the object, which substantially meets the area designated by the user.

Figures 30, 31:
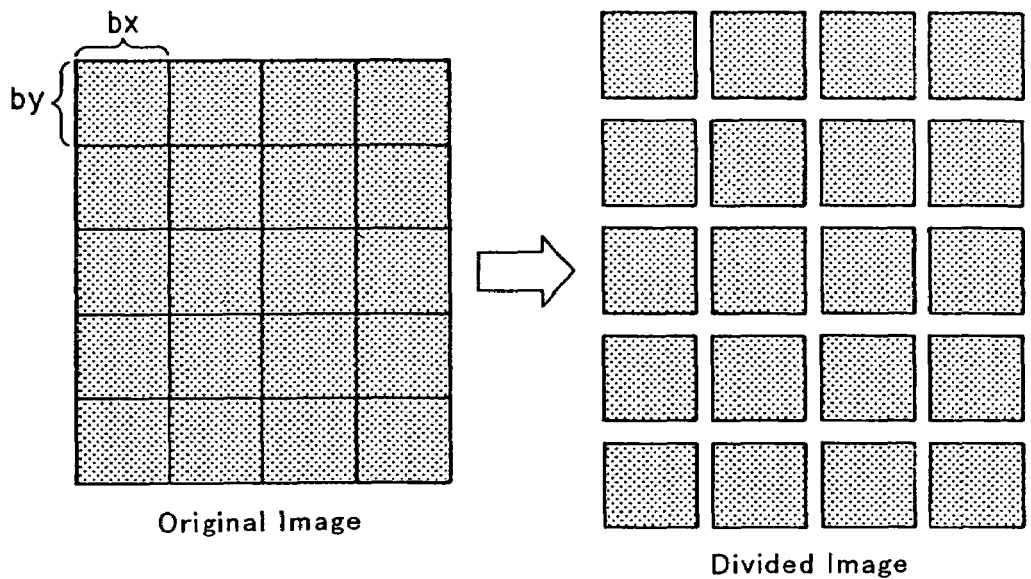
FIG. 30 illustrates how to decompose image data into plural block areas.
FIG. 31 illustrates a method for storing image data after decomposing into plural block areas among object data.

FIG. 30 mimetically illustrates how to divide image data into blocks each of a specified size (bx×by). As shown right in FIG. 30, image data for each division of the image is stored as a unit. In this instance, data classification identifier is of 0x44. FIG. 31 shows a method for storing image data divided into several blocks. As shown in FIG. 31, the numbers of vertical and horizontal pixels of the image and a compression method for each block are first stored, then the number of horizontal pixels of each block and the number of vertical pixels of each block are stored. Each block images including data size and block image data are then stored in order of so-called TV-raster scan. The block image data is compressed in advance by the designated method. The retrieval is now performed by reading only blocks included at least partly in an area designated by the user, thus reducing the loss of time for reading excessive portion of the object. This contributes to fast turning of pages of a book on the display screen. This division-to-block storing method may be also applied to each bit plane image having a data classification identifier 0x41 or 0x42, a thinned image of 0x43 and each frame data of 0xA0 or 0xA1.

Figure 32:
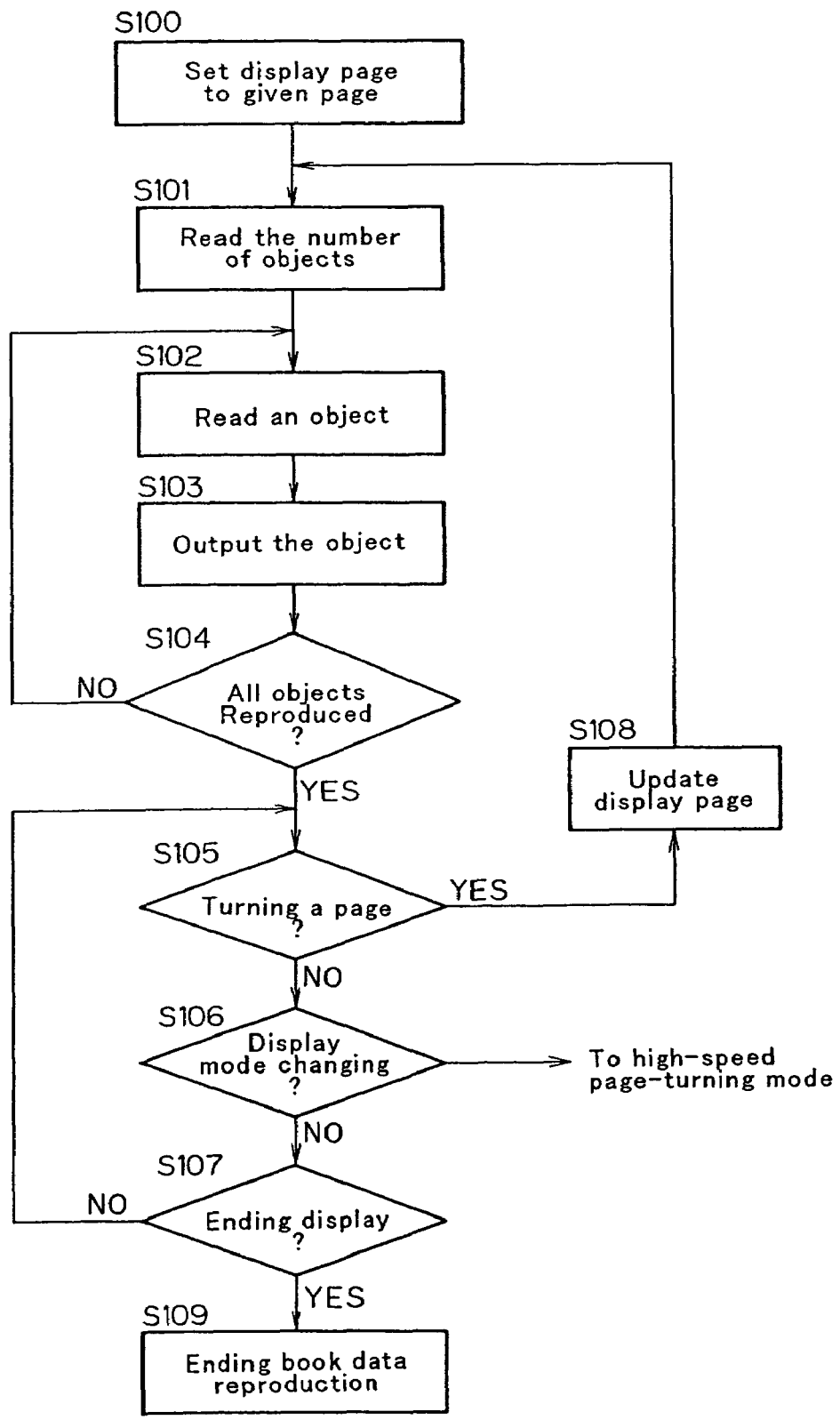
FIG. 32 is a flow chart illustrating a procedure of processing in a usual book-reading mode by an electronic book display device according to the present invention.

The operation of the electronic book display device is described below with reference to flowchart of FIG. 32.

This device provides two display modes: a normal reading mode in which a page is turned to a next every time when a command for turning a page is input through a page-turning requesting means 107 and a high-speed (fast) page-turning mode in which pages are fast turned for example for retrieving a desired page. When the device is powered, it works in the normal reading mode and transmits into the high-speed page-turning mode when the user inputs a request for changing over the mode through a display mode changeover requesting means 108 while displaying a page data. In practice, the current normal reading mode is turned over to the high-speed page-turning mode when the user clicked a mouse on a mode-changing button indicated on the display screen. The operation in each mode is as follows:

Referring to a flowchart of FIG. 32, the operation of the device in the normal reading mode is first described as follows:

In Step S100, the display page is set to a given page. The given page to be opened just after turning on the power is a front page of a book or a page having been displayed last in the last time. When the mode is changed, the given page is the page having been opened in the preceding mode. On the set page, the number of objects is read from the set page data area (Step S101). The object data per each of objects composing the page is read from the recording medium (Step S102), the data is processed for reproduction in accord with the value of the data classification identifier (Step S103). In Step S104, it is checked whether all objects within the page have been processed or not. If any object has not yet be processed, the process returns to Step S102 for processing the object to be reproduced. If all objects have been processed, the process advances to Step S105.

Step S103 is supplemented by following: The processing in Step S103 is switched over in accord with the value of the data classification identifier. For example, with the data classification identifier having a value of 0x41, each bit-plane image is read and thawed (expanded) at Step S102 and restored to form the initial image to be displayed on the display screen. For example, a monochromatic image having pixels whose values being recorded each by n bits is processed as follows:

Expressing each bit-plane image as Bi(x, y) (i=0, . . . , n−1: the smaller i is, the more significant bit-plane image is), the initial image I(x, y) is restored and displayed by calculating the equation for each pixel:

$$I(x, y) = \sum_{i=0}^{n-1} Bi(x, y) \times 2^{n-i-1}$$

For an object with a data classification identifier of 0x42, an initial image (before decomposition) is restored from a significant bit-plane image and an insignificant bit-plane image, which were read and thawed at Step S102. For example, if the image before decomposition is monochromatic and the significant bit-plane image U(x, y) is composed of significant n bits and the insignificant bit-plane image D(x, y) is composed of insignificant m bits, the initial image I(x, y) can be restored and displayed by calculating the following equation for each pixel:

$I(x,y)=U(x,y)\times 2^m+D(x,y)$

For image data with a data classification identifier 0x43, an initial image is restored from a thinned image and remaining pixel data by using the specified pixel-sampling interval for the data and the restored image is displayed.

For video data with a data classification identifier 0xA1, representative frame data in a representative frame data area and frame data in a remaining video data area are rearranged in order of time with reference to frame numbers in the representative frame data area and, then, frame data is displayed in order of time at a specified time interval.

For image data with a data classification identifier 0x44, each block image is thawed (expanded) and a position of each block in the initial image is determined from the numbers of vertical and horizontal pixels of each block and the numbers of vertical and horizontal pixels of the image before decomposition, and the initial image is synthesized from the image blocks and displayed.

On completion of outputting all objects composing the page being displayed, Step S105 examines whether a request for turning the page is input from the page-turning requesting means 107. If the request is given, the page number is changed to that of the page to be displayed at Step S108 and the process returns to Step S101 whereat the designated page data is processed to reproduce and display the page data. With no request for turning the page, Step S106 further examines whether a request for changing the current mode is input through the display mode changeover requesting means 108. If the request is given, then the process transmits to processing of display data in the high-speed page-turning mode.

With no request for changing the display mode, Step S107 examines whether the user requests for finishing the reproduction of the page data. If so, the reproduction of the book data is finished (Step S109). With no request for finishing the reproduction of page data, the process returns to Step S105 and, then, Steps S105 to S107 are repeatedly performed until the user's request regarding any of Steps S105 to S107 is input.

Figure 33:
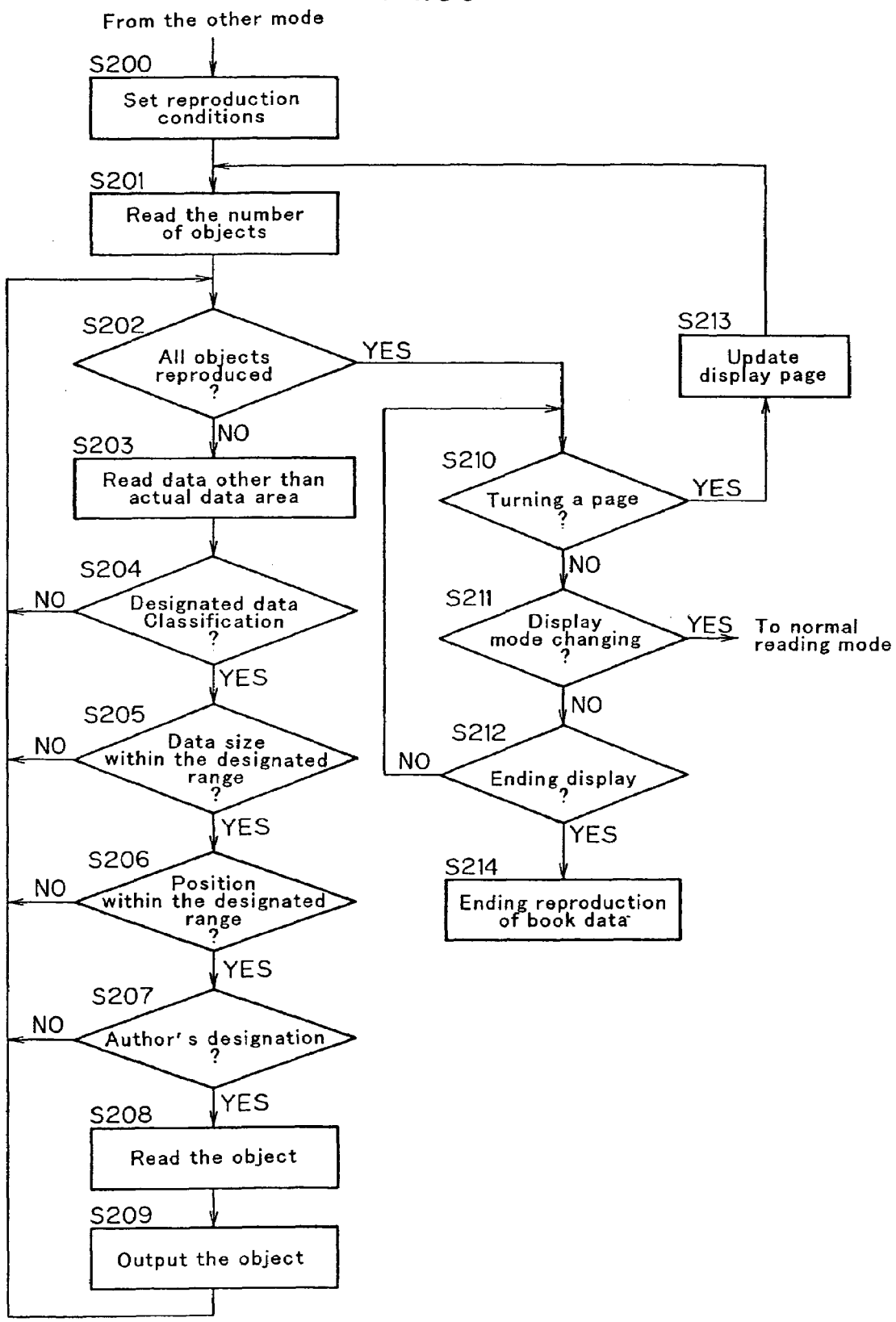
FIG. 33 is a flow chart illustrating a procedure of processing in a high-speed page-turning mode by the electronic book display device.

Referring now to the flowchart of FIG. 33, the operation of the device in the high-speed page-turning mode will be described below.

When the display mode was changed from the normal reading mode to the high-speed page-turning mode, the device presents on its display screen a window in which the user can set conditions for reproduction of page data in the high-speed page turning mode as shown in FIG. 34 (Step S200). Step S200 is further described below in detail.

As shown in FIG. 34, the reproduction conditions are mainly classified to four contents: data classification, data size, position designation and only objects designated by the author. The objects to be reproduced are selected by a logical product of the conditions selected by the user.

The example shown in FIG. 34 requires the device to select and reproduce only object(s) that satisfies the two restrictions of "data classification" and "position designation". In this instance, the data size and the designation by the author are neglected.

The data classification is to restrict the reproducible object by each data classification.

The reproducible object(s) is restricted to one, several or all of four types: character, image, audio and video. For example, if one remembers an image on a certain page or sound listened from a certain page of the book and wants to find that page by the image or sound, this feature item is effective to use. If character and image are selected in the window shown in FIG. 34, the device reads the value of the data classification identifier for each object data for reproduction from the recording medium when opening each page. The device then reads only object data identified by an identifier 0x01 (for character data) and identifiers 0x40, 0x41, 0x42, 0x43 and 0x44 (for image data) in the actual data area and reproduces them. The device skips sound data and video data contained in the page without reproducing them by recognizing the data size shown in FIG. 19. The data classification allows the user to set further detailed condition on reproduction of page data. Namely, the user clicks the mouse on the button "Detail" on the display screen, by which a window shown in FIG. 35 is open on the display screen. This window allows the user to set the detailed conditions for each data classification. The conditions set thereat by the user will be reflected on the processing at Step S208.

FIG. 35 presents a window in which the user can input settings for image data and video data. Namely, the user sets either one of two conditions for image data and video data respectively: all data in an actual data area are read and displayed just like turning pages in the normal reading mode or only summary data is displayed for the objects identified by data classification identifiers 0x40 (color image) and 0x41, 0x42, 0x43 (image data), 0xA1 (video data). However, monochromatic image (with identifier 0x40) and the object (with identifier 0xA0) have no summary data and they are displayed in the normal page-turning mode irrespective of the settings in this window. In case of displaying only summary data, it is further possible to flexibly set a desirable displaying rate of the summary data by changing the position of a setting knob.

For image data with the data classification identifier 0x41, the number of bit-plane images can be changed by selecting the position of a setting knob. For example, when the knob is set at a position dividing a line from the slow end to the fast and with an internal ratio of 2:1, merely the significant bit-plane images by n/3 (each pixel is composed of n-bits) are read and displayed.

For image data with the data classification identifier 0x43, a thinned image is read and displayed in enlargement if the knob is set at a position closer to the slow side, while merely a thinned image is read and displayed without enlargement if the knob is set at a position closer to the fast side. Namely, magnification of the thinned image can be changed by regulating the position of the knob.

For color image data with data classification identifier 0x40, the first plane image is read and displayed irrespective of the setting knob.

For image data with data classification identifier 0x42, only a significant bit image is read and displayed irrespective of the setting knob.

For video data with data classification identifier 0xA1, the number of frames (data) from the representative frame data area can be changed by changing set position of the knob. Namely, the position of the knob changes the number of frames from one to the number of frames, which is registered in the representative frame area.

In FIG. 35, only image data and video data can be set but setting items for character data and sound can be added to the items in the window.

In the window of FIG. 34, a value set in the item "data size" simply restricts the reproducible objects by the data size. Since all objects are stored in the format shown in FIG. 19, the device examines data sizes of the objects therein, reads and reproduces only objects having smaller size than the threshold input by the user.

A settable item "Position designation" in the window of FIG. 34 restricts reproducible objects by the area of the page in which objects are disposed.

An area (position) is designated by inputting the coordinate values in the blanks of the item. It can be also designated on a whole image on the display screen by pointing with pen at a left top point and a right bottom point of an area.

A settable item "Only Objects designated by the Author" in the window of FIG. 34 is used for selecting reproducible objects based on the contents (with a reproduction identifier when turning pages at a high speed) set in advance for each object by the author. Once this item is selected, the device selects and reproduces only objects designated by the author by using the above identifier while turning pages at a high speed.

In Step S200, when the reproduction conditions are set, then the device reads value in the area "the number of objects" in the page data stored in the format of FIG. 18 (Step S201), performs the loop processing of Steps S203 to S209 by the number of objects. On completion of processing for all objects, the process transfers from Step S202 to Step S210.

In detail, if any unprocessed object was found in Step S202, the process transfers to Step S203 whereat among object data stored in the format shown in FIG. 19, data in an area other than the actual data area is read. In Step S204, the device examines whether the read value of the data classification identifier meets the reproduction conditions set by the user in Step S200. If no selection of the data classification identifiers was made in Step S200, the examination is not performed in Step S204 and the process advances to Step S205. On the contrary, when the restriction of the data classification was made in Step S200, the device examines whether the object being reproduced corresponds in its classification to the object designated by the user to be reproduced. If so, the process advances to Step S205 for processing the object data. If not, the process transfers to Step S202 for processing the next object. Step S205 further examines whether the data size of the object being reproduced falls in the range specified at Step S200.

A data size value in the data size area of the object data stored in the format of FIG. 19 is examined and a size other than the actual data area is subtracted therefrom. The resultant value is examined whether it falls within the range specified by the User. If so, the process advances to Step S206. If not, the process returns to Step S202 for processing the next object.

If no designation of the data size was made at Step S200, the above examination is not performed at Step S205 and the process advances to Step S206 whereat the device examines whether the object being reproduced exists in the area designated by the user.

Referring to the area "coordinate values of the origin and end point" (FIG. 19), the device examines whether the object is included at least at its part in the area designated by the user at Step S200. If so, the process advances to Step S207. If not, the process returns to Step S202 for processing the next object. If the position designation was not made at Step S200, the examination is not performed at Step S206 and the process advances to Step S207. In Step S207, the device examines a value in the area "Reproduction identifier when turning pages at a high speed" for the object being reproduced and advances the process to Step S208 if the value was set to be reproduced when turning pages at a high speed. If not, the process returns to Step S202 for processing the next object. If the author's object designation was not selected at Step S200, the above examination is not performed at Step S207 and the process advances to Step S208. In Steps S208 and S209, objects that has not restricted by the Steps S204 to S207 are processed and reproduced. In Step S208, the object data is read according to the data classification identifier and the contents set at Step S200 for the object and outputted as necessary.

Figure 36:
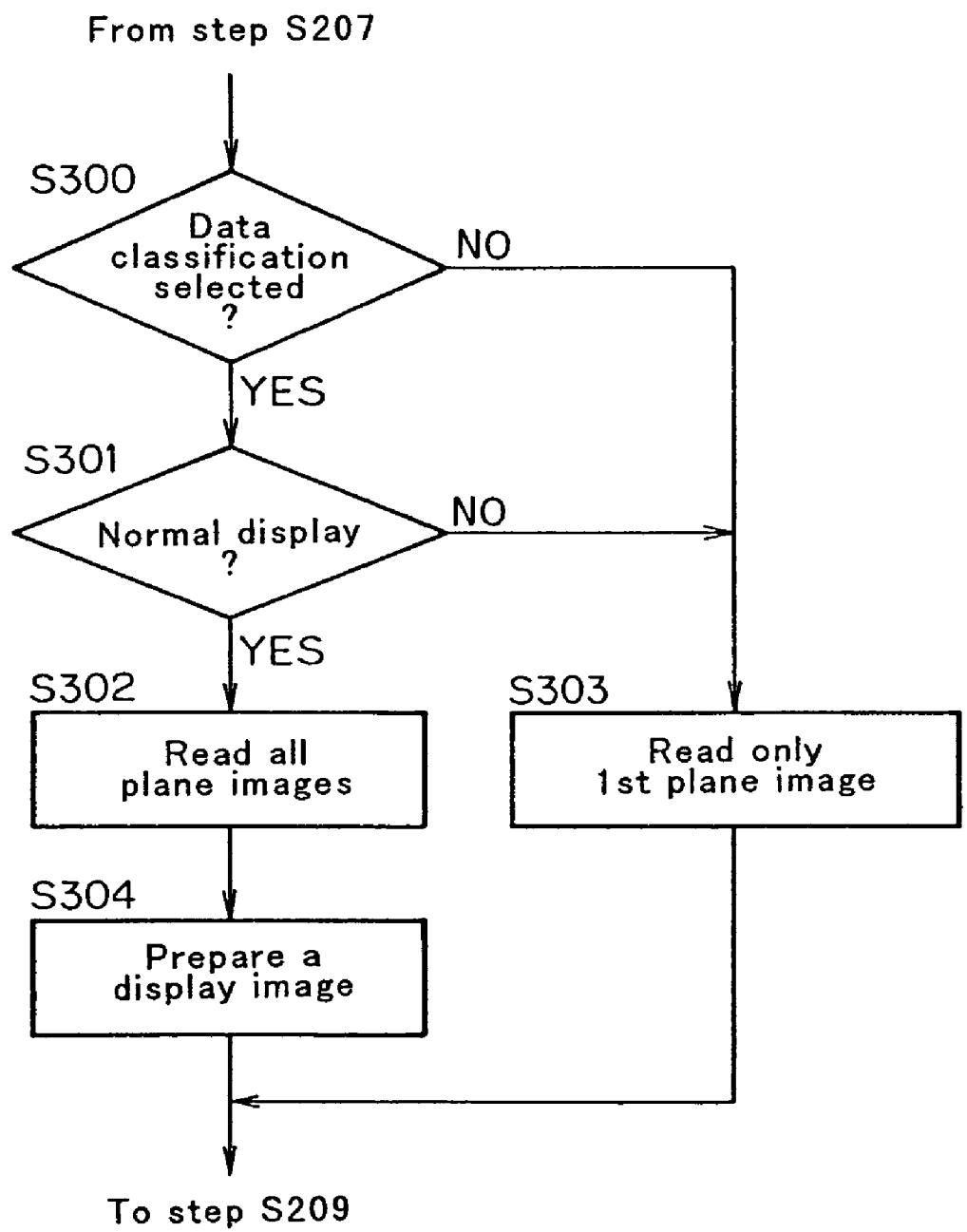
FIG. 36 is a flow chart illustrating a procedure for reading image data having a data-type identifier of 0x40 in the high-speed page-turning mode.

The procedure of Step S208 for an object identified by the data classification identifier 0x40 is shown in FIG. 36. First in Step S300, the device examines whether the data classification is selected as a restriction item at Step S200. If not, only the first plane image (FIG. 21) is read, thawed (expanded) (Step S303) and displayed (Step S209). Since a monochromatic image has only one plane, all data is read and displayed. For a color image, only Y-plane image data is read and displayed as summary data. If the data classification is selected as a restriction item (Step S300), the contents of the detailed data-classification settings inputted through the window shown in FIG. 35 are examined. If the image data is set for normal display, the process advances to Step S302 whereat all plane image data is read and thawed (expanded) as necessary. The read plane image data is processed, if necessary, to form a display image (Step S304) that is then displayed (Step S209). If the image was not set for normal display at Step S301, only the first plane image is read, thawed (expanded) if necessary (Step S303) and then displayed (Step S209).

Figure 37:
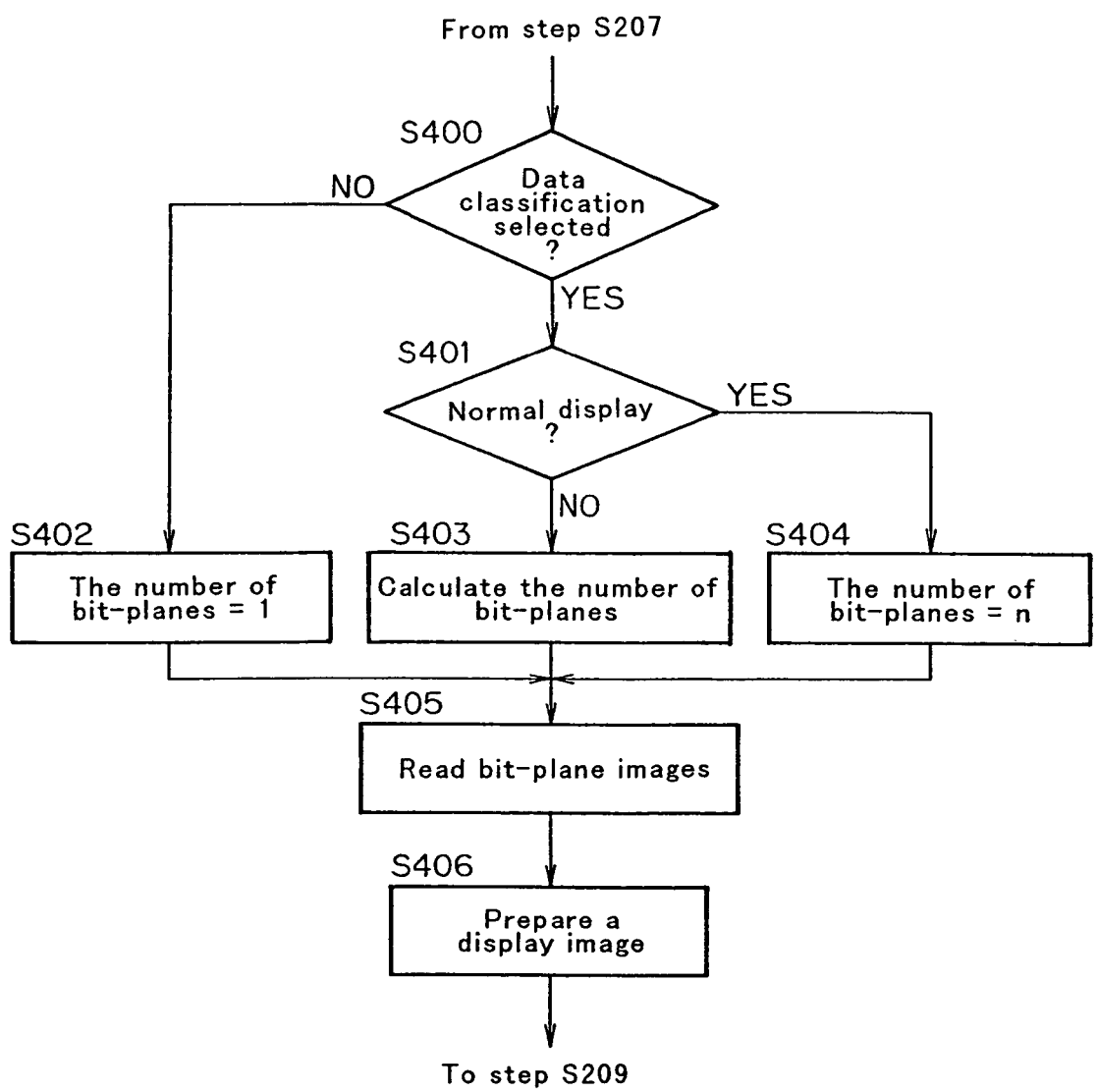
FIG. 37 is a flow chart illustrating a procedure of reading image data stored after decomposing into individual bit planes in the high-speed page-turning mode.

The procedure of Step S208 for an object identified by the data classification identifier 0x41 is shown in FIG. 37. First in Step S400, the device examines whether the data classification is selected as a restriction item at Step S200. If not, the number of bit-planes is set to 1 (Step S402) and the process advances to Step S405. If the data classification is selected as a restriction item, the device examines the contents of the detailed data classification settings to see whether the normal display of the image data is selected (Step S401). If so, the number of bit planes to be read from the recording medium is set to n (the number of bits for each of pixels composing the image) (Step S404) and the process advances to Step S405. If only the summary data display is selected (not normal display), the process advances to Step S403 at which the number of bit planes to be read is calculated from the set position of the setting knob. The process then advances to Step S405 whereat the calculated number of bit-plane images are read from the recording medium and thawed (expanded) as necessary. The read plane images are processed by converting its optical density (Step S406) to produce display image. For example, a monochromatic image having pixels whose values being recorded each by n bits is processed as follows:

Expressing each bit-plane image as Bi(x, y) (i=0, . . . , n−1: the smaller i is, the more significant bit-plane image is) and the number of read bit-planes as pnum, the display image I(x, y) is determined by calculating the following equation for each pixel:

$$I(x, y) = \sum_{i=0}^{pnum-1} Bi(x, y) \times 2^{n-i-1}$$

On completion of Step S402, the process returns to Step S209 to display the prepared display image.

Figure 38:
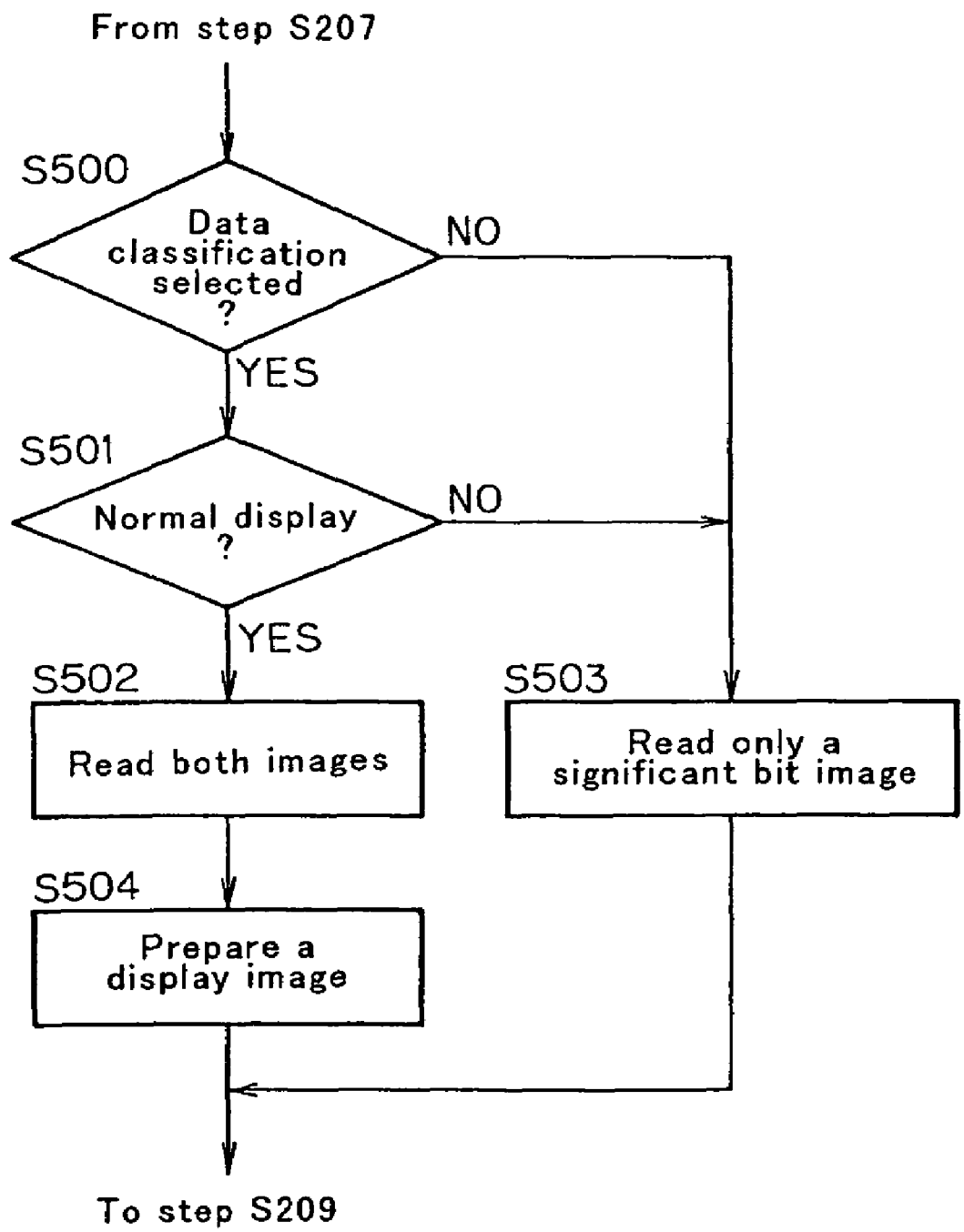
FIG. 38 is a flow chart illustrating a procedure of reading image data stored after decomposing into two bit image, i.e., a significant bit image and an insignificant bit image in a high-speed page-turning mode.

The procedure of Step S208 for an object identified by the data classification identifier 0x42 is shown in FIG. 38. First in Step S500, the device examines whether the data classification is selected as a restriction item at Step S200. If not, only a significant bit-image is read from the recording medium (Step S503) and thawed (expanded) as necessary. The process then advances to Step S504. If the data classification is selected as a restriction item, the device examines the contents of the detailed data classification settings to see whether the normal display of the image data is selected (Step S501). If so, both the significant bit image data and the insignificant bit image data are read from the recording medium (Step S502) and thawed (expanded) as necessary. The process then advances to Step S504. If only the summary data display is selected, the process advances to Step S503 at which only a significant bit-image is read from the recording medium and thawed (expanded) as necessary. The process then advances to Step S504 at which a display image is generated from the image data read at Step S502 or S503. For example, the image before decomposition is monochromatic and the significant bit-image U(x, y) is composed of significant n bits and the insignificant bit-image D(x, y) is composed of insignificant m bits. The display image I(x, y) is determined by calculating the following equation for each pixel:

$$I(x,y)=U(x,y)\times 2^m+D(x,y)$$

in case of reading both the upper-bit-image and the lower-bit-image;

$$I(x,y)=U(x,y)\times 2^m$$

in case of reading only the significant bit-image.

The image prepared for display is displayed at Step S209.

Figure 39:
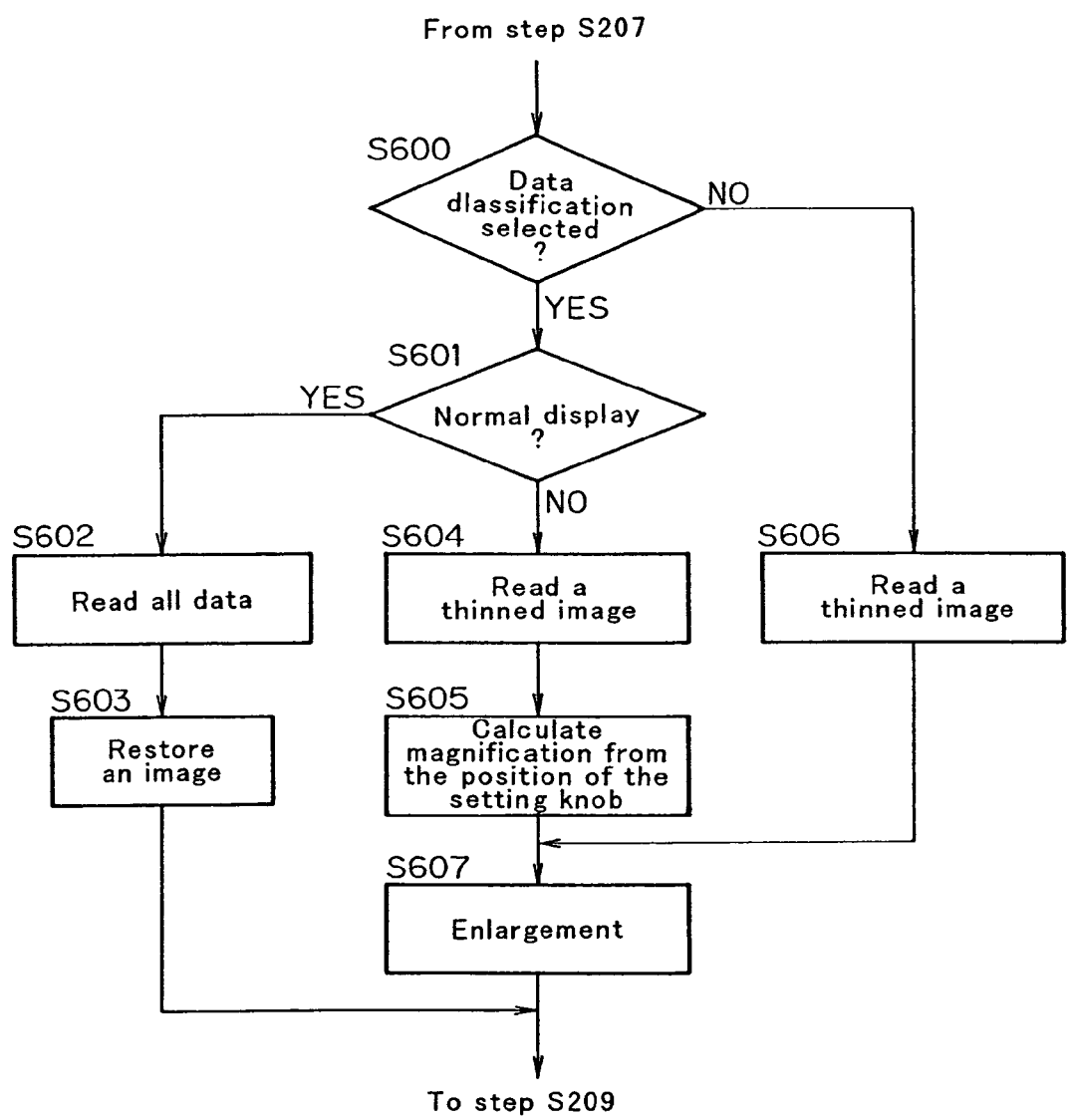
FIG. 39 is a flow chart illustrating a procedure of reading image data stored after decomposing into (a thinned image and remaining pixel data) when operating in the high-speed page-turning mode.

FIG. 39 is a flowchart depicting the procedure of Step S208 for the object with a data classification identifier 0x43. First in Step S600, the device examines whether the data classification is selected as a restriction item at Step S200. If not, the process advances to Step S606 at which the thinned image data is read from the recording medium and thawed (expanded) as necessary. The process then advances to Step S607 at which the thinned image is enlarged by a factor of a pixel-sampling interval value referring to thinning interval value in FIG. 27 and then displayed (Step S209). If the data classification is selected as a restriction item (Step S600), the contents of the detailed data-classification settings are examined (S601). If the image data is set for normal display, the image data is read from the recording medium in the same manner as in the normal reading mode and the initial image data is restored (Step S602, Step S603) and displayed (Step S209).

If only the summary data display is selected (Step S601), the thinned image data is read from the recording medium and thawed (expanded) as necessary (Step S604). The position of setting knob position is examined in the image item in the window of FIG. 35 and a magnification factor of the thinned image is calculated (Step S605). For example, when the setting knob exists at a position dividing a line from "Fast" end to "Slow" end in the ratio of s:(1−s) (where, 0≦s≦1) and a pixel-sampling interval of the thinning image is t, the magnification is determined according to the following equation:

$$\text{Magnification}=s\times t+(1-s)\times 1$$

The thinned image is enlarged by the above magnification (Step S607) and the enlarged image is displayed at Step S207.

Figure 40:
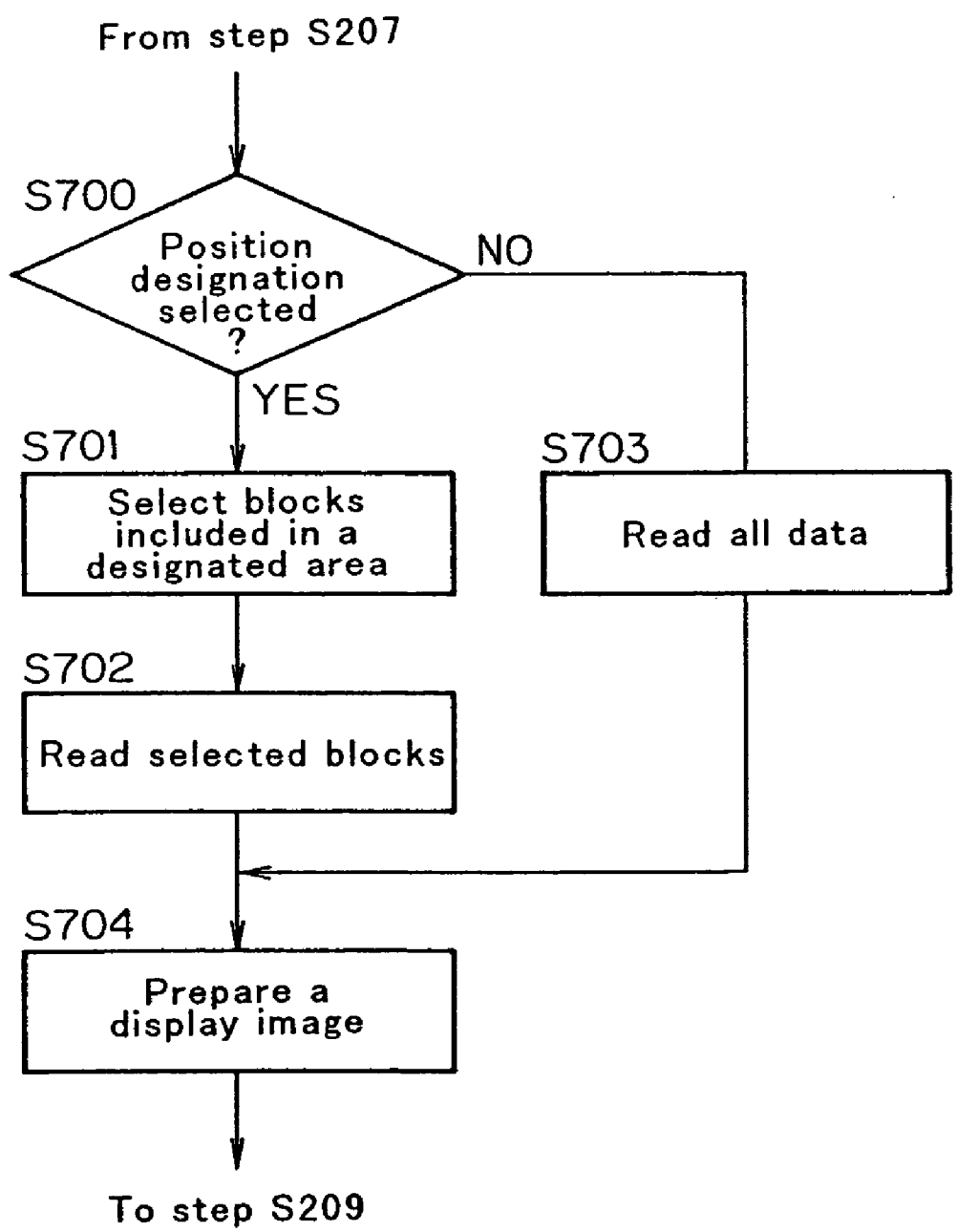
FIG. 40 is a flow chart illustrating a procedure of reading image data stored after decomposing blocks into plural areas in the high-speed page-turning mode.

The procedure of Step S208 for an object identified by the data classification identifier 0x44 is shown in FIG. 40. First in Step S700, the device examines whether the position designation is selected as a restriction item at Step S200. If not, the device carries out the same procedure that it does in the normal reading mode: the device reads all data (Step S703), restores an initial image (Step S704) and displays the restored image (Step S209). If the position designation is selected as a restriction item (Step S700), the device selects all block images included at least partly in an area designated by the user by searching them by the position of each block on the page, where the position is calculated by the numbers of vertical and horizontal pixels and the numbers of vertical and horizontal pixels in block (Step S702). The device then reads the selected block image data from the recording medium, thaws (expands) the data as necessary (Step S702), correctly rearranges the read block images to form a display image (Step S704) and then displays the display image at Step S209.

Figure 41:
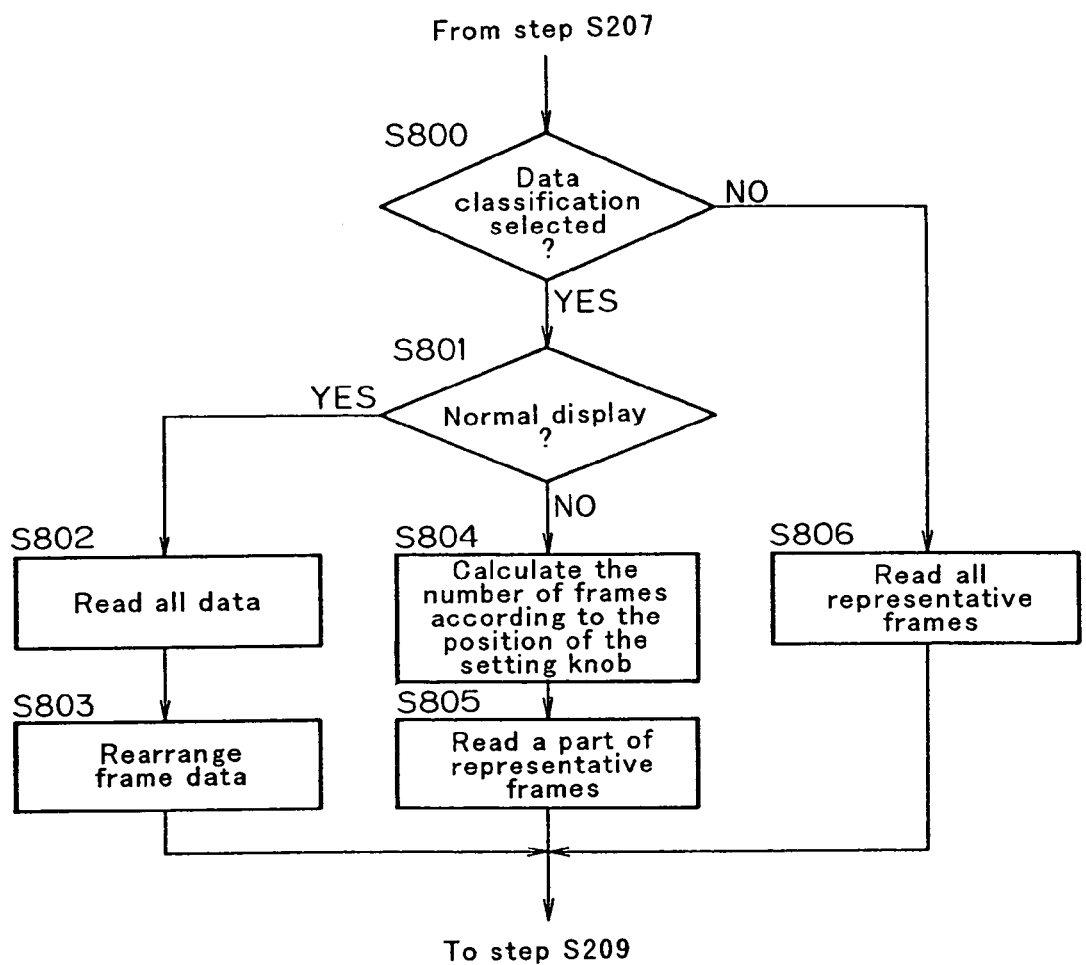
FIG. 41 is a flow chart illustrating a procedure of reading video data stored in a representative frame area in the high-speed page-turning mode.

The procedure of Step S208 for an object identified as video data by the data classification identifier 0xA1 is shown in FIG. 41. First in Step S800, the device examines whether the data classification is selected as a restriction item at Step S200. If not, the device reads data in the representative frame data area in the format shown in FIG. 29 from the recording medium, thaws (expands) data as necessary (Step S806) and then displays the frame data in order of time at a specified time interval on the display screen (Step S209). If the data classification is selected as a restriction item (Step S800), the device examines the contents of the detailed data classification settings to see whether the normal display of the video data is selected (Step S801). If so, the device carries out the same procedure that it does in the normal reading mode: i.e., the device reads all data (Step S802), rearranges the frame data in order of time (Step S803) and reproduces the video data (Step S209). If only the summary data display is selected for the item "Video Data" at Step S801, the device calculates the number of reproducible frames from the position of the setting knob (Step S804) and selectively reads from the recording medium data of the frames by the determined number in the representative frame data area in such a way that the frames may be arranged in order of time and/or at the same time interval. The device then thaws (expands) the data as necessary (Step S805) and reproduces the video data (Step S209).

The procedure of Step S208 for objects stored in other format is the same as that of normal reading mode. However, if objects are specially devised for turning pages at a high speed, they may be differently processes.

When all objects existing on the page being displayed have been completely processed in Steps S203 to S209, the process transfers from S202 to S210.

The processing in Steps S210-S214 is similar to the processing in Steps S105-S109.

As described above, by devising format for storing each object data composing page, the electronic display control device of the present invention can easily read only necessary object data from the recording medium and reproduce the data, thus realizing high-speed turning of pages according to the present invention.

The electronic book display control device of the present invention can easily read a part of data containing various kinds of object data such as characters, images, audio and video, thus realizing high-speed turning of pages for quick retrieval of a desired page.

The invention claimed is:

1. A reproduction display device for reproducing and displaying element data prepared in units of reproduction, comprising:
   display device control means for exerting overall control over the operation of said display device;
   data input and preparation means for receiving input element data corresponding to a sequence of said units of reproduction;
   element data storage means for storing said element data so as to be readable in an order necessary for the transition from one of said units of reproduction to the next in said sequence;
   display means for displaying said element data;
   means for preparing and transmitting said element data to said display means for the sequential display of said units of reproduction separated by transition displays including gradually decreasing portions of a present unit of reproduction and gradually increasing portions of a next unit of reproduction; and
   display control means including user input means for controlling said display means;
   wherein data of each element data is divided into data for high-speed reproduction and remaining data by said data preparation means and stored in said element data storage means respectively and
   the data for high-speed reproduction is subsequently reproduced by said display control means and displayed by said display means once a command for starting high-speed reproduction is given via said user input means.

2. A reproduction display device as defined in claim 1, wherein in the element data stored in said storage means, the data for high-speed reproduction is caused to be compressed differently by said data input and preparation means from the remaining data in accordance with determinations made by said data input and preparation means for preparing said received element data as units of reproduction.

3. A reproduction display device as defined in claim 1, wherein the element data is color image data consisting of data from a multi-plane color system and the data for high-speed reproduction is a plane image composed of monochromatic components representing data from a specified one of said multiple planes and the remaining data is a plane image composed of all of the components of said color image except those components contained in said specified one of said multiple planes.

4. A reproduction display device as defined in claim 1, wherein the element data is image data representative of a bit plane image composed of a plurality of sub-bit plane images each represented by data representative of a corresponding bit of each of a plurality of multi-bit pixels forming said image and the data for high-speed reproduction is a predetermined sub-bit plane image produced by corresponding bits of each pixel and the remaining data is a sub-bit plane image produced by the non-predetermined bits of each pixel of said image.

5. A reproduction display device as defined in claim 1, wherein the element data is image data representative of a bit plane image composed of a at least three sub-bit plane images each represented by data representative of a corresponding bit of each of a plurality pixels, wherein each pixel includes at least three bits, forming said image and the data for high-speed reproduction is a predetermined sub-bit-plane image produced by corresponding bits of at least two of said sub-bit plane images produced by corresponding bits of each pixel and the remaining data is the remaining sub-bit-plane image or images.

6. A reproduction display device as defined in claim 5, wherein a number of pixels of each of the at least two sub bit-plane images that include bits composing the data for reproduction is changeable by a user's designation.

7. A reproduction device as defined in claim 1, wherein said element data is image data comprising a planar array of pixels and said data for high-speed reproduction is a thinned image comprises a plurality of spaced pixels produced by omitting a predetermined number of pixels between each pair of spaced pixels from said planar array and said remaining data is the remaining pixels other than the pixels contained in said thinned image.

8. A reproduction display device as defined in claim 7, wherein a display size of a thinned image for high-speed reproduction formed by said data for high-speed reproduction is changeable between a normal size and an enlarged size by user's designation when receiving and displaying the thinned image reproduced image.

9. A reproduction display device as defined in claim 1, wherein the element data is video data comprising a plurality of time-sequential frame images and the data for high-speed reproduction is a predetermined number of said plurality of time-sequential frame images selected from the video data at intervals representative of a predetermined time interval and the remaining data is the frame images other than said predetermined number of said plurality of time-sequential frame images.

10. The reproduction display device as defined in claim 9, wherein the predetermined number of time-sequential frame images constituting the data for high-speed reproduction is changeable by user's designation.

11. A reproduction display device as defined in claim 1, wherein said reproduction display device is further provided with a condition setting means for setting at least one of a data classification of the element data, data size of the data element and position information of the data element in a unit to be reproduced and the element data to be reproduced at a high-speed is selected based on conditions set by the condition setting means.

* * * * *